(12) United States Patent
Lu et al.

(10) Patent No.: US 10,701,690 B2
(45) Date of Patent: Jun. 30, 2020

(54) DATA TRANSMISSION METHOD

(71) Applicant: HUAWEI TECHNOLOGIES CO., LTD., Shenzhen (CN)

(72) Inventors: Zhenwei Lu, Beijing (CN); Deping Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/271,871

(22) Filed: Feb. 10, 2019

(65) Prior Publication Data

US 2019/0174491 A1    Jun. 6, 2019

Related U.S. Application Data

(63) Continuation of application No. PCT/CN2016/094917, filed on Aug. 12, 2016.

(51) Int. Cl.
| | |
|---|---|
| *H04L 12/28* | (2006.01) |
| *H04W 72/04* | (2009.01) |
| *H04W 72/02* | (2009.01) |
| *H04W 4/46* | (2018.01) |

(52) U.S. Cl.
CPC ....... *H04W 72/0446* (2013.01); *H04W 72/02* (2013.01); *H04W 72/042* (2013.01); *H04W 4/46* (2018.02)

(58) Field of Classification Search
CPC ...................................................... H04L 12/28
USPC ........................................................ 370/329
See application file for complete search history.

(56) References Cited

U.S. PATENT DOCUMENTS

| | | |
|---|---|---|
| 2016/0044668 A1 | 2/2016 | Yoon et al. |
| 2016/0066317 A1 | 3/2016 | Chae et al. |
| 2016/0381666 A1 | 12/2016 | Kim et al. |
| 2017/0079085 A1 | 3/2017 | Yang et al. |
| 2020/0021410 A1* | 1/2020 | Choi ..................... H04L 1/00 |

FOREIGN PATENT DOCUMENTS

| | | |
|---|---|---|
| CN | 104202740 A | 12/2014 |
| CN | 105101431 A | 11/2015 |
| CN | 105490793 A | 4/2016 |
| WO | 2015142066 A1 | 9/2015 |

* cited by examiner

*Primary Examiner* — Dang T Ton
(74) *Attorney, Agent, or Firm* — Kilpatrick Townsend & Stockton LLP

(57) ABSTRACT

Embodiments provide user equipment includes a processor and a transmitter. The processor determines a time domain resource within a T2 time length based on second time domain resource indication information, where the second time domain resource indication information indicates a time domain resource occupied for data transmission within a T1 time length, and T2 is twice of T1. The processor further generates second control information, where the second control information includes the second time domain resource indication information. The transmitter sends the second control information. The transmitter further sends data on the time domain resource that is determined within the T2 time length. In this way, only a time domain pattern with a half time length of a period is defined, so that total time domain patterns in a system are applicable to a vehicle-to-vehicle communication scenario. In addition, time domain resource indication information occupies fewer bits, thereby saving system resources.

20 Claims, 10 Drawing Sheets

First 10 ms   Last 10 ms

DATA TRANSMISSION METHOD

CROSS-REFERENCE TO RELATED APPLICATIONS

This application is a continuation of International Application No. PCT/CN2016/094917, filed on Aug. 12, 2016, the disclosure of which is hereby incorporated by reference in its entirety.

TECHNICAL FIELD

This application relates to the field of communications technologies, and in particular, to a terminal device, a network device, and a data transmission method.

BACKGROUND

A device-to-device (D2D) communications technology has been introduced in a Long Term Evolution (LTE) system. D2D is a direct device-to-device communications technology. A largest difference between the D2D and a conventional cellular communications technology lies in that communication can be directly performed between user equipments (UE) without a need of forwarding by a base station (e.g. Evolved NodeB (eNodeB)). The base station may perform resource configuration, scheduling, and coordination, and the like, to assist the user equipments in the direct communication. A typical application scenario of D2D communication is a public safety scenario such as communication between firemen, and a typical service type is a voice service.

As shown in FIG. 1, a D2D communications system includes a base station 101, user equipment (UE) 1, and UE2. The base station 101 and the UE1 may perform wireless cellular communication, and the UE1 and the UE2 may perform D2D communication.

As intelligent driving and self-driving technologies emerge for vehicles, people are stimulated to study use of an existing cellular communications network to assist in vehicle-to-vehicle communication. An LTE system has advantages such as a high rate, a low delay, large coverage, and the like, supports high-speed mobile terminals, and is applicable to the vehicle-to-vehicle communication.

To sum up, in a wireless communications system such as the LTE system, a technology applicable to the vehicle-to-vehicle (V2V) communication is in an urgent need.

SUMMARY

In view of the above, this application provides user equipment, a base station, and a data transmission method, to reduce signaling overheads.

According to a first aspect, an embodiment of this application provides a data transmission method, including:

determining, by sending user equipment, a time domain resource within a T2 time length based on second time domain resource indication information, where the second time domain resource indication information is used to indicate a time domain resource occupied for data transmission within a T1 time length, and T2 is twice T1;

sending, by the sending user equipment, second control information, where the second control information includes the second time domain resource indication information;

sending, by the sending user equipment, data on the time domain resource that is determined within the T2 time length;

receiving, by receiving user equipment, the second control information sent by the sending user equipment, and obtaining the second time domain resource indication information from the second control information, where the second time domain resource indication information is used to indicate the time domain resource occupied for the data transmission within the T1 time length;

determining, by the receiving user equipment, the time domain resource within the T2 time length based on the second time domain resource indication information, where T2 is twice T1; and receiving, by the receiving user equipment, the data on the time domain resource that is determined within the T2 time length.

In the technical solution in this embodiment of this application, only a time domain pattern with a half time length of a period is defined, so that a total quantity of time domain patterns in a system is greater than that in a D2D technology and less than that in an existing V2V technology. The technical solution is applicable to a vehicle-to-vehicle communication scenario. In addition, in the technical solution in this embodiment of this application, time domain resource indication information occupies fewer bits, thereby saving system resources.

Optionally, the sending user equipment receives first control information from a base station. The first control information includes first time domain resource indication information configured by the base station for the sending user equipment.

Optionally, the sending user equipment determines the second time domain resource indication information based on the first control information received from the base station, or the user equipment autonomously selects the second time domain resource indication information.

Optionally, the determining, by sending user equipment, a time domain resource within a T2 time length based on second time domain resource indication information includes:

equally dividing the T2 time length into two T1 time lengths; and using, by the sending user equipment or the receiving user equipment, the second time domain resource indication information within one T1 time length, and using a reversed second time domain resource indication information within the other T1 time length; or using, by the sending user equipment or the receiving user equipment, the second time domain resource indication information within one T1 time length, and reversing a time domain resource within the T1 time length, to obtain a time domain resource within the other T1 time length.

In the foregoing technical solution in this embodiment of this application, a time domain pattern with a first half time segment and a time domain pattern with a last half time segment are set in a mirror symmetric manner. This resolves a problem that different user equipments occupy exactly a same time domain resource within an entire time segment, and improves system reliability.

Optionally, the sending user equipment sends data on a time domain resource within a T3 time length, and the receiving user equipment receives the data on the time domain resource within the T3 time length; and if T3 is greater than T2, a time domain resource occupation manner determined within the T2 time length is applied to the T3 time length; or if T3 is less than T2, a time domain resource occupation manner determined within the T2 time length is truncated and then applied to the T3 time length.

Optionally, the second control information further includes an applicable time length, and the applicable time length is T3.

In the foregoing technical solution in this embodiment of this application, the time domain resource indication information is applied to different time lengths, and may be further applicable to a scenario with more types of transmission time lengths. Therefore, system flexibility is improved.

Optionally, the second control information further includes a period length, and the period length defines a period length value of current data transmission.

In the foregoing technical solution in this embodiment of this application, a variable period length may be further obtained, and a beneficial effect is that the technical solution is applicable to a more complex transmission scenario.

Optionally, the second control information is SA sent on an SA resource, and the second time domain resource indication information is a T-RPT.

Optionally, the second control information further includes a target time length, where the target time length is a time length obtained after a bitmap corresponding to the T-RPT is truncated, or the target time length is a time length obtained after a bitmap corresponding to the T-RPT is truncated and is extended once; and T1 is equal to the time length obtained after the bitmap is truncated.

In the foregoing technical solution in this embodiment of this application, the bitmap may be further applicable to a variable length, and a beneficial effect is that the technical solution is applicable to a more complex transmission scenario.

Optionally, the time domain resource, indicated by the second time domain resource indication information, within the T1 time length is obtained in a table lookup manner or through calculation.

According to a second aspect, an embodiment of this application provides user equipment, including:

a processor and a transmitter, where the processor is configured to determine a time domain resource within a T2 time length based on second time domain resource indication information, where the second time domain resource indication information is used to indicate a time domain resource occupied for data transmission within a T1 time length, and T2 is twice T1; the processor is further configured to generate second control information, where the second control information includes the second time domain resource indication information; the transmitter is configured to send second control information; and the transmitter is further configured to send data on the time domain resource that is determined within the T2 time length.

In the technical solution in this embodiment of the second aspect of this application, only a time domain pattern with a half time length of a period is defined, so that a total quantity of time domain patterns in a system is greater than that in a D2D technology and less than that in an existing V2V technology. The technical solution is applicable to a vehicle-to-vehicle communication scenario. In addition, in the technical solution in this embodiment of this application, time domain resource indication information occupies fewer bits, thereby saving system resources.

Optionally, the user equipment further includes a receiver, configured to receive first control information from a base station. The first control information includes first time domain resource indication information configured by the base station for the user equipment.

Optionally, the processor determines the second time domain resource indication information based on the first control information received from the base station, or the processor autonomously selects the second time domain resource indication information.

Optionally, that the time domain resource within the T2 time length is determined based on the second time domain resource indication information includes: equally dividing the T2 time length into two T1 time lengths; and using, by the processor, the second time domain resource indication information within one T1 time length, and using a reversed second time domain resource indication information within the other T1 time length; or using, by the processor, the second time domain resource indication information within one T1 time length, and reversing a time domain resource within the T1 time length, to obtain a time domain resource within the other T1 time length.

In the foregoing technical solution in this embodiment of the second aspect of this application, a time domain pattern with a first half time segment and a time domain pattern with a last half time segment are set in a mirror symmetric manner. This resolves a problem that different user equipments occupy exactly a same time domain resource within an entire time segment, and improves system reliability.

Optionally, the processor is configured to: determine a time domain resource within a T3 time length; and if T3 is greater than T2, apply, to the T3 time length, a time domain resource occupation manner determined within the T2 time length; or if T3 is less than T2, truncate a time domain resource occupation manner determined within the T2 time length, and then apply the manner to the T3 time length; and the transmitter is configured to send data on the time domain resource within the T3 time length.

Optionally, the second control information generated by the processor further includes an applicable time length, and the applicable time length is T3.

In the foregoing technical solution in this embodiment of the second aspect of this application, the time domain resource indication information is applied to different time lengths, and may be further applicable to a scenario with more types of transmission time lengths. Therefore, system flexibility is improved.

Optionally, the second control information generated by the processor further includes a period length, and the period length defines a period length value of current data transmission.

In the foregoing technical solution in this embodiment of the second aspect of this application, a variable period length may be further obtained, and a beneficial effect is that the technical solution is applicable to a more complex transmission scenario.

Optionally, the second control information is SA sent on an SA resource, and the second time domain resource indication information is a T-RPT.

Optionally, the second control information generated by the processor further includes a target time length, where the target time length is a time length obtained after a bitmap corresponding to the T-RPT is truncated, or the target time length is a time length obtained after a bitmap corresponding to the T-RPT is truncated and is extended once; and T1 is equal to the time length obtained after the bitmap is truncated.

In the foregoing technical solution in this embodiment of the second aspect of this application, the bitmap may be further applicable to a variable length, and a beneficial effect is that the technical solution is applicable to a more complex transmission scenario.

Optionally, the processor obtains the time domain resource, indicated by the second time domain resource indication information, within the T1 time length in a table lookup manner or through calculation.

According to a third aspect, an embodiment of this application provides user equipment, including:

a receiver and a processor, where the receiver is configured to receive control information sent by another user equipment; the processor is configured to obtain time domain resource indication information from the control information, where the time domain resource indication information is used to indicate a time domain resource occupied for data transmission within a T1 time length; the processor is further configured to determine a time domain resource within a T2 time length based on the time domain resource indication information, where T2 is twice T1; and the receiver is further configured to receive data on the time domain resource that is determined within the T2 time length.

In the technical solution in this embodiment of the third aspect of this application, only a time domain pattern with a half time length of a period is defined, so that a total quantity of time domain patterns in a system is greater than that in a D2D technology and less than that in an existing V2V technology. The technical solution is applicable to a vehicle-to-vehicle communication scenario. In addition, in the technical solution in this embodiment of this application, the time domain resource indication information occupies fewer bits, thereby saving system resources.

Optionally, that the processor determines a time domain resource within a T2 time length based on the time domain resource indication information includes: equally dividing the T2 time length into two T1 time lengths; and using, by the processor, the time domain resource indication information within one T1 time length, and using a reversed time domain resource indication information within the other T1 time length; or using, by the processor, the time domain resource indication information within one T1 time length, and reversing a time domain resource within the T1 time length, to obtain a time domain resource within the other T1 time length.

In the foregoing technical solution in this embodiment of the third aspect of this application, a time domain pattern with a first half time segment and a time domain pattern with a last half time segment are set in a mirror symmetric manner. This resolves a problem that different user equipments occupy exactly a same time domain resource within an entire time segment, and improves system reliability.

Optionally, the processor is configured to: determine a time domain resource within a T3 time length; and if T3 is greater than T2, apply, to the T3 time length, a time domain resource occupation manner determined within the T2 time length; or if T3 is less than T2, truncate a time domain resource occupation manner determined within the T2 time length, and then apply the manner to the T3 time length; and the receiver is configured to receive data on the time domain resource within the T3 time length.

Optionally, the control information received by the receiver further includes an applicable time length, and the applicable time length is T3.

In the foregoing technical solution in this embodiment of the third aspect of this application, the time domain resource indication information is applied to different time lengths, and may be further applicable to a scenario with more types of transmission time lengths. Therefore, system flexibility is improved.

Optionally, the control information received by the receiver further includes a period length, and the processor sets a period length value of current data transmission as the period length in the control information.

In the foregoing technical solution in this embodiment of the third aspect of this application, a variable period length may be further obtained, and a beneficial effect is that the technical solution is applicable to a more complex transmission scenario.

Optionally, the control information is SA sent on an SA resource, and the time domain resource indication information is a T-RPT.

Optionally, the control information received by the receiver further includes a target time length, where the target time length is a time length obtained after a bitmap corresponding to the T-RPT is truncated, or the target time length is a time length obtained after a bitmap corresponding to the T-RPT is truncated and is extended once; and T1 is equal to the time length obtained after the bitmap is truncated.

In the foregoing technical solution in this embodiment of the third aspect of this application, the bitmap may be further applicable to a variable length, and a beneficial effect is that the technical solution is applicable to a more complex transmission scenario.

Optionally, the processor obtains the time domain resource, indicated by the time domain resource indication information, within the T1 time length in a table lookup manner or through calculation.

According to a fourth aspect, an embodiment of this application provides a base station, including:

a processor, configured to generate first control information, where the first control information includes first time domain resource indication information; and a transmitter, configured to send the first control information to user equipment, where the first time domain resource indication information may be used by the user equipment to determine a time domain resource within a T2 time length, the first time domain resource indication information is used to indicate a time domain resource occupied for data transmission within a T1 time length, and T2 is twice T1.

In the technical solution in this embodiment of the fourth aspect of this application, only a time domain pattern with a half time length of a period is defined, so that a total quantity of time domain patterns in a system is greater than that in a D2D technology and less than that in an existing V2V technology. The technical solution is applicable to a vehicle-to-vehicle communication scenario. In addition, in the technical solution in this embodiment of this application, time domain resource indication information occupies fewer bits, thereby saving system resources.

Optionally, that the time domain resource within the T2 time length is determined based on the first time domain resource indication information includes: equally dividing the T2 time length into two T1 time lengths; and using, by the user equipment, the first time domain resource indication information within one T1 time length, and using the reversed first time domain resource indication information within the other T1 time length; or using, by the user equipment, the first time domain resource indication information within one T1 time length, and reversing a time domain resource within the T1 time length, to obtain a time domain resource within the other T1 time length.

In the foregoing technical solution in this embodiment of the fourth aspect of this application, a time domain pattern with a first half time segment and a time domain pattern with a last half time segment are set in a mirror symmetric manner. This resolves a problem that different user equipments occupy exactly a same time domain resource within an entire time segment, and improves system reliability.

According to a fifth aspect, an embodiment of this application provides a data transmission method, including:

sending, by sending user equipment, time domain resource indication information, where the time domain resource indication information indicates K time domain resources of M time domain resources, the first of the K time domain resources is the first of the M time domain resources, remaining K−1 of the K time domain resources are a subset of remaining M−1 of the M time domain resources, M is a positive integer, K is a positive integer, K is less than or equal to M, and K is a quantity of transmission times of one piece of data;

transmitting, by the sending user equipment, data on the K time domain resources;

receiving, by receiving user equipment, the time domain resource indication information, where the time domain resource indication information indicates the K time domain resources of the M time domain resources, the first of the K time domain resources is the first of the M time domain resources, the remaining K−1 of the K time domain resources are a subset of the remaining M−1 of the M time domain resources, M is the positive integer, K is the positive integer, K is less than or equal to M, and K is the quantity of transmission times of one piece of data; and receiving, by the receiving user equipment, the data on the K time domain resources.

Optionally, that K is a positive integer further includes: the sending user equipment receives K from the base station; or the sending user equipment autonomously selects K; or K is preconfigured on the sending user equipment.

Optionally, that M is a positive integer further includes: the sending user equipment receives M from the base station; or the sending user equipment autonomously selects M; or M is preconfigured on the sending user equipment.

Optionally, the M time domain resources further include: the M time domain resources may be continuous or discontinuous in time domain.

In the technical solution in this embodiment of this application, a location of the first time domain resource is fixed, so that only a location of a remaining time domain resource needs to be indicated. Therefore, a quantity of bits required by time domain indication information is reduced, system resources are saved, implementation is more flexible, and a delay requirement of data transmission can be better satisfied.

According to a sixth aspect, an embodiment of this application provides user equipment, including:

a processor and a transmitter, where the processor is configured to determine K time domain resources of M time domain resources based on second time domain resource indication information, where the first of the K time domain resources is the first of the M time domain resources, remaining K−1 of the K time domain resources are a subset of remaining M−1 of the M time domain resources, M is a positive integer, K is a positive integer, K is less than or equal to M, and K is a quantity of transmission times of one piece of data; the processor is further configured to generate second control information, where the second control information includes the second time domain resource indication information; the transmitter is configured to send the second control information; and the transmitter is further configured to transmit data on the K time domain resources.

Optionally, that K is a positive integer further includes: sending user equipment receives K from the base station; or the sending user equipment autonomously selects K; or K is preconfigured on the sending user equipment.

Optionally, that M is a positive integer further includes: the sending user equipment receives M from the base station; or the sending user equipment autonomously selects M; or M is preconfigured on the sending user equipment.

Optionally, the M time domain resources further include: the M time domain resources may be continuous or discontinuous in time domain.

In the technical solution in this embodiment of this application, a location of the first time domain resource is fixed, so that only a location of a remaining time domain resource needs to be indicated. Therefore, a quantity of bits required by time domain indication information is reduced, system resources are saved, implementation is more flexible, and a delay requirement of data transmission can be better satisfied.

According to a seventh aspect, an embodiment of this application provides user equipment, including:

a receiver and a processor, where the receiver is configured to receive control information sent by another user equipment; the processor is configured to obtain time domain resource indication information from the control information, where the time domain resource indication information is used to indicate K time domain resources of M time domain resources, the first of the K time domain resources is the first of the M time domain resources, remaining K−1 of the K time domain resources are a subset of remaining M−1 of the M time domain resources, M is a positive integer, K is a positive integer, K is less than or equal to M, and K is a quantity of transmission times of one piece of data; and the receiver is further configured to receive data on the K time domain resources.

In the technical solution in this embodiment of this application, a location of the first time domain resource is fixed, so that only a location of a remaining time domain resource needs to be indicated. Therefore, a quantity of bits required by time domain indication information is reduced, system resources are saved, implementation is more flexible, and a delay requirement of data transmission can be better satisfied.

According to an eighth aspect, an embodiment of this application provides a wireless communications system, and the wireless communications system includes the user equipment and the base station in any one of the first aspect to the seventh aspect.

According to a ninth aspect, an embodiment of this application provides a computer storage medium, configured to store a computer software instruction used by the user equipment in any one of the first aspect to the eighth aspect. The computer software instruction includes a program designed to perform the foregoing aspects.

According to a tenth aspect, an embodiment of this application provides a computer storage medium, configured to store a computer software instruction used by the base station in any one of the first aspect to the eighth aspect. The computer software instruction includes a program designed to perform the foregoing aspects.

According to an eleventh aspect, an embodiment of this application provides a chip, configured to perform the method performed by the user equipment in any one of the first aspect to the eighth aspect.

DESCRIPTION OF EMBODIMENTS

Figure 1:
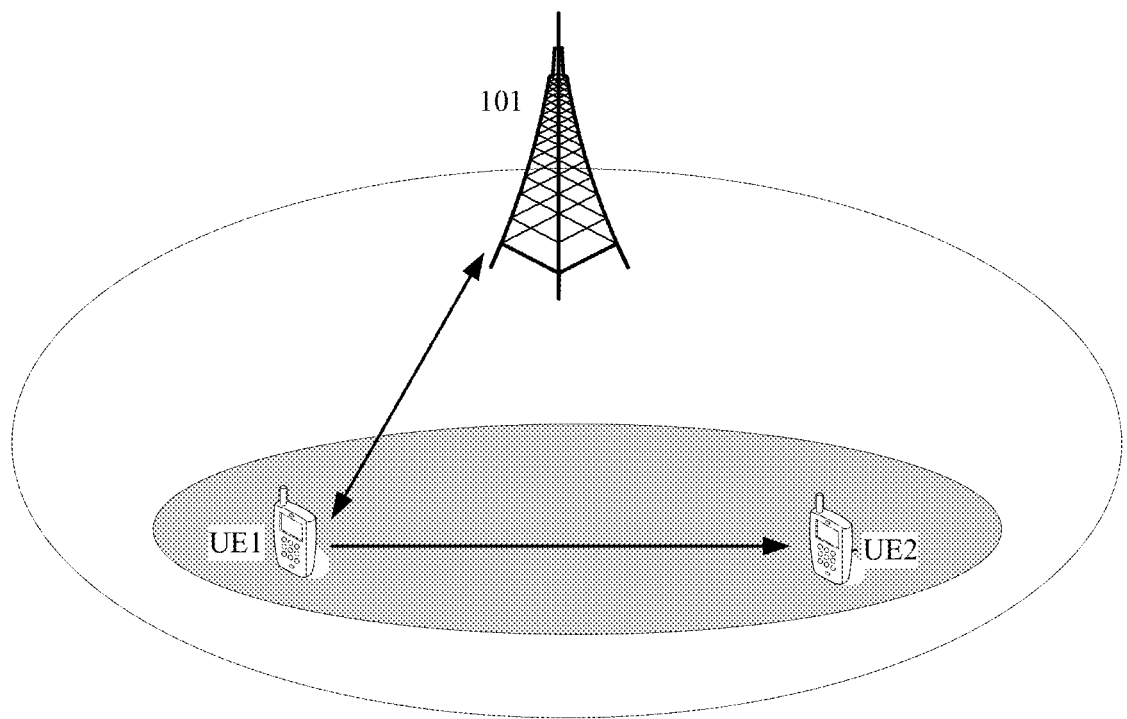
FIG. 1 is a schematic diagram of a system performing D2D transmission in the prior art.

To make the objectives, technical solutions, and advantages of this application more understandable, the following provides detailed descriptions. The detailed descriptions provide various implementations of an apparatus and/or a method by using block diagrams, flowcharts, and/or examples. These block diagrams, flowcharts, and/or examples include one or more functions and/or operations. Persons skilled in the art may understand that each function and/or operation in these block diagrams, flowcharts, and/or examples can be performed independently and/or jointly by using various hardware, software, and firmware, or any combination of hardware, software, and firmware.

Technologies described in this specification may be applied to various communications systems, for example, current 2G; 3G and 4G communications systems and a next-generation communications system, for example, a Global System for Mobile Communications (GSM) system, a Code Division Multiple Access (CDMA) system, a Time Division Multiple Access (TDMA) system, a Wideband Code Division Multiple Access (WCDMA) system, a Frequency Division Multiple Access (FDMA) system, an orthogonal frequency division multiple access (OFDMA) system, a single-carrier FDMA (SC-FDMA) system, a general packet radio service (GPRS) system, a Long Term Evolution (LTE) system, and other communications systems.

Embodiments in this specification are described with reference to user equipment and/or a base station.

The user equipment may be a device that provides a user with voice and/or data connectivity, a handheld device with a wireless connection function, or another processing device connected to a wireless modem. The user equipment may communicate with one or more core networks through a radio access network (RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, and exchange voice and/or data with the radio access network. For example, it may be a device such as a personal communication service (PCS) phone, a cordless phone, a Session Initiation Protocol (SIP) phone, a wireless local loop (WLL) station, or a personal digital assistant (PDA). The user equipment may be referred to as a mobile station, a mobile station (or Mobile), a remote station, an access point, a remote terminal, an access terminal, a user terminal, a user agent, or the like.

The base station (for example, an access point) may be a device that is in an access network and that communicates, through an air interface, with a wireless terminal by using one or more sectors. The base station may be configured to mutually convert a received over-the-air frame and an IP packet and serve as a router between the wireless terminal and a rest portion of the access network, where the rest portion of the access network may include an Internet protocol (IP) network. The base station may further coordinate attribute management of an air interface. For example, the base station may be a base transceiver station (BTS) in GSM or CDMA, or may be a NodeB in WCDMA, or may be an evolved NodeB (NodeB or eNB or e-NodeB) in LTE. This is not limited in this application.

Introduction of D2D Technology

In D2D technology, if user equipment is in cell coverage of a base station, the base station configures (configure) a transmission resource pool for D2D user equipment, so that the D2D user equipment performs data transmission. The resource pool is a time-frequency resource set. The user equipment may use a time-frequency resource in the resource pool to transmit and receive D2D data. The base station may configure a different resource pool for the user equipment in a system broadcast manner or in a dedicated signaling manner. Certainly, the user equipment may pre-configure a transmission resource pool. In this case, the user equipment may autonomously select a transmission resource from the preconfigured transmission resource pool to perform D2D transmission, and the base station does not need to configure a transmission resource pool.

Figure 2:
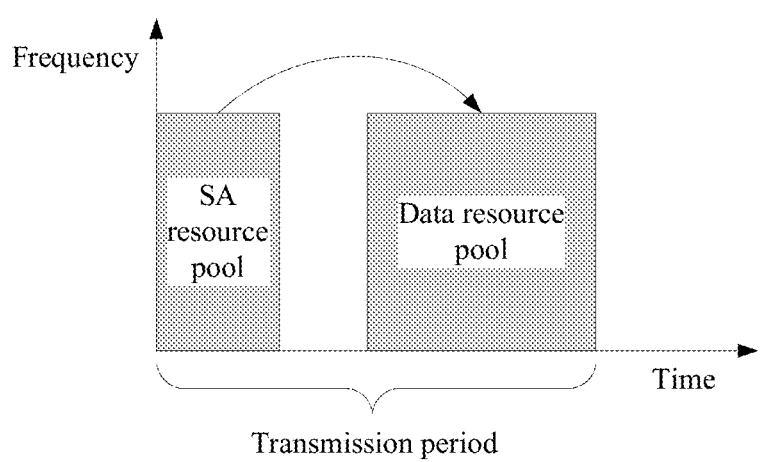
FIG. 2 is a schematic diagram of a D2D transmission resource pool according to an embodiment of this application.

As shown in FIG. 2, a transmission resource pool, for example, may include a scheduling assignment (SA) resource pool and a data resource pool. UE may transmit SA using an SA resource and transmit data using a data resource. The SA is used to indicate status information of data sent from transmit end UE. The status information includes time-frequency resource information, modulation and coding scheme (MCS) information, a frequency hopping indicator, timing advance (TA) information, group ID information (e.g. Group destination ID), and the like of the data. Receive end UE can receive D2D data based on indication of the SA. The data is D2D data that is sent by the transmit end UE at a time-frequency resource location indicated by the SA and by using a scheme indicated by the SA. In FIG. 2, a time domain length of the SA resource pool plus a time domain length of the data resource pool is a transmission period. The period, for example, may be 40 ms, 80 ms, or 160 ms, and a value of the period may be configured by the base station for the UE, or may be preconfigured by the UE.

A specific manner of configuring a resource pool in time domain is to specify a start point for the resource pool, so that the SA resource pool and the data resource pool are periodically repeated from the start point in time domain. Within the period, an SA resource is configured by using an SA resource bitmap. A length of the SA resource bitmap indicates how many continuous time domain resources starting from a period start point are likely to be used for the SA resource pool in one period. Which specific resources are to be actually used for the SA resource pool are determined based on content of the bitmap. For example, in the SA resource bitmap, a bit 1 indicates that a time domain resource corresponding to the bit is determined to be used for the SA resource pool, and a bit 0 indicates that a time domain resource corresponding to the bit is not to be used for the SA resource pool and may be used for another LTE service, another resource pool, or the like. The data resource pool is configured based on an offset and a data resource bitmap. The offset indicates an offset between the data resource pool and the SA resource pool in time domain, namely, a start location of the data resource pool. An intermediate time domain resource from the start location to a location at which the current period ends may be used for the data resource pool. The data resource bitmap is repeated in this range, until the period ends. Which specific resources are to be actually used for the data resource pool are determined based on content of the bitmap. Similar to the SA resource pool, in the data resource bitmap, a bit 1 indicates that a time domain resource corresponding to the bit is determined to be used for the data resource pool, and a bit 0 indicates that the bit is not to be used for the data resource pool and may be used for another LTE service, another resource pool, or the like. It can be learned from the foregoing configuration manner that the SA resource pool (or the data resource pool) within one period may include discontinuous time domain resources, or certainly, may include continuous time domain resources.

Figure 3:
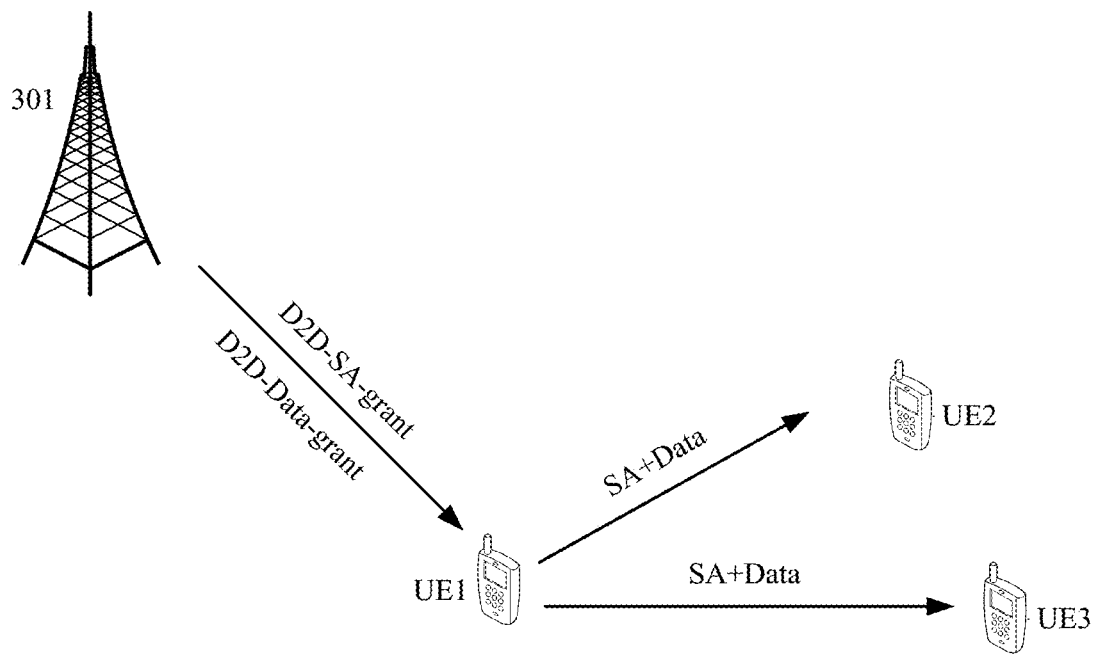
FIG. 3 is a schematic diagram of a D2D transmission mode 1 according to an embodiment of this application.

D2D technology may have two characteristics: D2D discovery and D2D communication. For the discovery, the user equipment periodically broadcasts information, so that user equipment surrounding the user equipment may detect the information and discover the user equipment. For the communication, data is directly transmitted between a plurality of user equipments and an SA+Data mechanism is used for data transmission. As shown in FIG. 3, a base station 301 allocates a resource in a resource pool to UE1 for D2D data transmission. The resource pool is configured by the base station for the UE1 in a previous process, or is preconfigured by the UE1. The UE1 separately sends, to UE2 and UE3, SA and D2D data on an SA resource and a data resource that are allocated by the base station 301. A D2D transmission mode shown in FIG. 3 is that the base station allocates a determined time-frequency resource in the resource pool to each UE, so that the UE performs D2D transmission. The D2D transmission mode shown in FIG. 3 is referred to as a mode 1. Another mode 2 (not shown in this figure) is that the UE autonomously selects a resource from the resource pool randomly to perform D2D transmission. In this case, the base station does not need to allocate a transmission resource to the UE.

A time domain resource indication method described in this application is described below by using an LTE system as an example.

Figure 4:
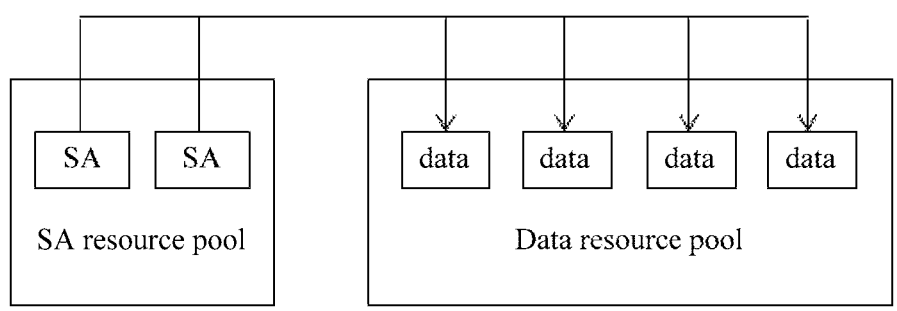
FIG. 4 is a schematic diagram of sending SA and data in time domain applying a D2D transmission communications technology according to an embodiment of this application.

In an LTE D2D communications technology, SA is transmitted in an SA resource pool, and D2D data is transmitted in a data resource pool. The two resource pools are separate in time domain. As shown in FIG. 4, SA is always transmitted two times in the SA resource pool, and data is always transmitted four times in the data resource pool. The SA includes a time resource pattern of transmission (T-RPT) that is used to indicate a location of data in time domain in each transmission. Receive side UE correctly receives the SA and obtains the T-RPT in the SA resource pool, and receives data on a corresponding time domain resource in the data resource pool based on time domain location information indicated by the SA (or the T-RPT in the SA).

Specifically, the T-RPT is a 7-bit index value, and a bitmap may be obtained through table lookup by using the index value. The bitmap may have a different length, for example, 6 bits, 7 bits, or 8 bits. In Table 1, an 8-bit bitmap is used as an example for description (because the table is too long, some content is omitted in Table 1, but understanding is not affected). Each bit in the bitmap corresponds to one subframe. If the bit is 1, it indicates that UE transmits D2D data in the subframe. If the bit is 0, it indicates that the UE does not transmit D2D data in the subframe. For example, for a bitmap whose index value is 0, only the first bit of the bitmap is "1". Therefore, the pattern indicates that UE transmits D2D data only in the first subframe. As shown in Table 1, in 8-bit bitmaps, there are eight types of bitmaps including one "1", and indexes are 0 to 7; there are 28 types of bitmaps including two "1", and indexes are 8 to 35; and that there are 70 types of bitmaps including four "1", and indexes are 36 to 105.

TABLE 1

| Time resource pattern index (Time Resource Pattern Index) | Quantity of "1" in a bitmap | Subframe indicator bitmap (subframe indicator bitmap) |
|---|---|---|
| 0 | 1 | (1, 0, 0, 0, 0, 0, 0, 0) |
| 1 | 1 | (0, 1, 0, 0, 0, 0, 0, 0) |
| ... | ... | ... |
| ... | ... | ... |
| 7 | 1 | (0, 0, 0, 0, 0, 0, 0, 1) |
| 8 | 2 | (1, 1, 0, 0, 0, 0, 0, 0) |
| 9 | 2 | (1, 0, 1, 0, 0, 0, 0, 0) |
| ... | ... | ... |
| ... | ... | ... |
| 35 | 2 | (0, 0, 0, 0, 0, 0, 1, 1) |
| 36 | 4 | (1, 1, 1, 1, 0, 0, 0, 0) |
| 37 | 4 | (1, 1, 1, 0, 1, 0, 0, 0) |
| ... | ... | ... |
| ... | ... | ... |
| 105 | 4 | (0, 0, 0, 1, 1, 1, 1, 1) |
| 106 | 8 | (1, 1, 1, 1, 1, 1, 1, 1) |
| 107 to 127 | Reserved | Reserved |

Figure 5:
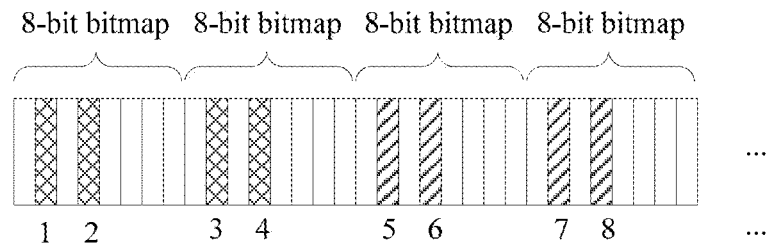
FIG. 5 is a schematic diagram of repeating a D2D transmission bitmap in a data resource pool according to an embodiment of this application.

In the LTE system, one subframe has a length of one Transmission Time Interval (TTI), namely, 1 ms. An 8-bit bitmap can indicate only eight subframes (8 ms). However, a time domain length of the data resource pool may be greater than a length of the bitmap. Therefore, the bitmap needs to be repeated continuously in the data resource pool, until a period ends. As shown in FIG. 5, an 8-bit bitmap indicates that UE transmits D2D data in the second and the fourth subframes of every eight subframes and the bitmap is repeated in the data resource pool. FIG. 5 shows that the bitmap is repeated four times. In FIG. 5, several subframes are available for D2D data transmission of the UE, and are sequentially numbered by 1, 2, 3, . . . , and 8. Every four subframes correspond to fixed four transmissions of one piece of D2D data such as a MAC PDU. Each MAC PDU may be transmitted in one subframe. For example, the first to the fourth subframes are used to repeatedly transmit a MAC PDU 1 four times, and the fifth to the eighth subframes are used to repeatedly transmit a MAC PDU 2 four times.

Introduction of V2V Technology

A demand for the existing Internet of Vehicles stimulates people to conduct research on vehicle-to-vehicle communication by using an existing wireless cellular network. Vehicle-to-vehicle communication in an Internet of Vehicles system is also device-to-device communication. Therefore, a D2D communications technology may be used to implement V2V communication.

It can be learned from the foregoing introduction that a plurality of problems exist if the D2D technology is used to transmit V2V data. In the D2D technology, a quantity of time domain patterns that can be indicated by a T-RPT is excessively small. A time domain pattern indicates which subframes are occupied by UE in time domain to perform data transmission. In the foregoing example, a 7-bit T-RPT indicates a maximum of 128 time domain patterns, and there are still 128 time domain patterns after cyclic repetition. A higher vehicle density results in selection of a same T-RPT by more vehicles. This means that these vehicles always perform data transmission at a same moment. As a result, a serious semi-duplex problem arises, and overall system performance is affected. In a V2V scenario, a vehicle may select a resource in a sensing manner to transmit data. If a quantity of time domain patterns that can be indicated by the T-RPT is small, there may be a case in which the vehicle selects a time domain pattern that the vehicle considers to be optimal but cannot be indicated by the T-RPT. In this case, the vehicle can merely select a non-optimal time domain pattern from a range that can be indicated by the T-RPT. This further limits system performance.

Figure 6:
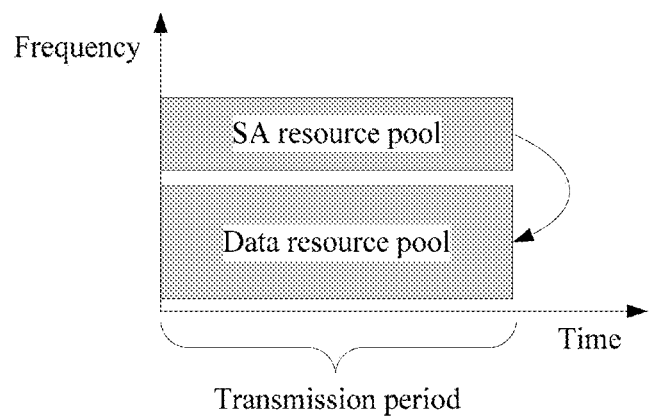
FIG. 6 is a schematic diagram of a V2V transmission resource pool according to an embodiment of this application.

Considering a factor such as timeliness of data transmission, a distribution form of an SA resource pool and a data resource pool in the V2V communication discussed at a current stage is also improved. In the V2V communication, the SA resource pool and the data resource pool are divided in a frequency division manner, as shown in FIG. 6. In a frequency division scenario, SA and corresponding V2V data may be transmitted in a same subframe, or may be transmitted in different subframes.

In the V2V communication, an amount of V2V data that needs to be sent by a vehicle each time is very small, and usually, transmission of the V2V data can be completed in one subframe. In addition, different from the D2D communication in which data is always repeatedly transmitted four times, one piece of V2V data may usually be repeatedly transmitted one, two, or four times within one period. Therefore, in the V2V communication, a maximum of four subframes are indicated by using the T-RPT within one period. If the T-RPT indicates more than four subframes, a redundant subframe is not used actually, and a waste of transmission resources is caused. For example, still in FIG. 5, an 8-bit bitmap corresponding to the T-RPT in the D2D technology includes two "1", and the bitmap is repeated four times within one period. In this case, eight subframes are indicated within one period for data transmission. However, in V2V, only four subframes need to be indicated within one period.

Because of the foregoing reason, in the V2V communication discussed at the current stage, the bitmap corresponding to the T-RPT is not repeated within one period, and the bitmap directly indicates a location of a subframe actually used within one period. In FIG. 6, a time domain length of the data resource pool is one period, and the period may be, for example, 40 ms, 80 ms, or 160 ms. An example in which a V2V period is 40 ms and transmission is repeated four times within each period is used for description below.

When the period is 40 ms, four subframes at different locations are selected within the period to transmit V2V data. There are totally $$\binom{40}{4} = 91390$$

possible patterns, namely, 91390 time domain patterns, a T-RPT with a total of $\lceil \log_2 91930 \rceil = 17$ bits is required to indicate a bitmap, and a length of the bitmap is 40 bits. It can be learned that a quantity of bits occupied by the T-RPT in the V2V technology is far greater than that in the D2D technology. This seriously increases overheads of the SA resource pool.

Figure 7:
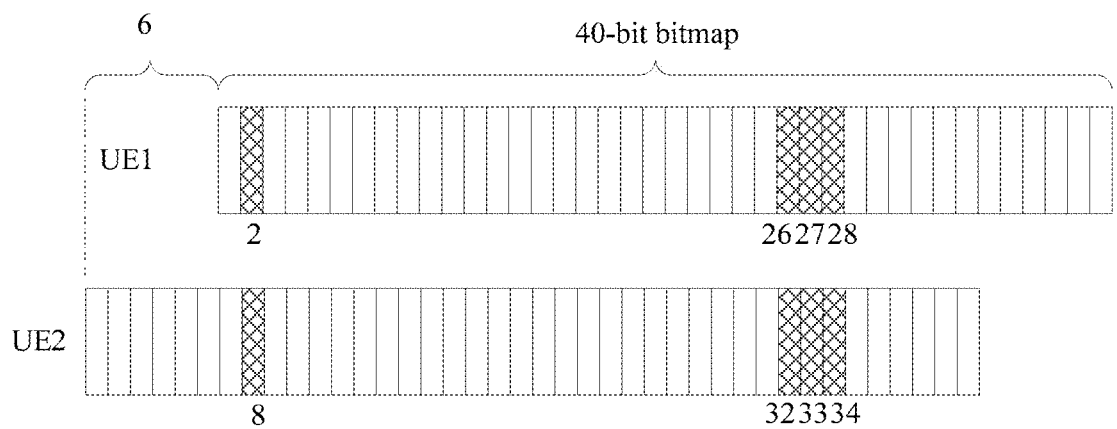
FIG. 7 is a schematic diagram of indicating a resource in a resource pool by using a 40-bit transmission bitmap during V2V transmission according to an embodiment of this application.

As shown in FIG. 7, a bit pattern indicated by a bitmap of UE1 is:

(0,1,0,0,0,0,0,0,0,0,0,0,0,0,0,0,0,0,0,0,0,0,0,0,0,1,1,1,0,0, 0,0,0,0,0,0,0,0,0,0); and a bit pattern indicated by a bitmap of UE2 is:

(0,0,0,0,0,0,0,1,0,0,0,0,0,0,0,0,0,0,0,0,0,0,0,0,0,0,0,0,0,0, 0,1,1,1,0,0,0,0,0,0).

In the V2V communication, a start point at which each UE sends data may be different. As shown in FIG. 7, a sending period of the UE1 is later than that of UE2 by six subframes. Considering that a start point of a sending period of each UE is different, a quantity of time domain patterns is further extended. For example, if a period is 40 ms, a total quantity of time domain patterns is 91390×40=3655600 which is far greater than a quantity of vehicles in a small area, causing an excessive waste. When the period is greater than 40 ms, and reaches, for example, 50 ms, 100 ms, or 200 ms, the quantity of time domain patterns is further increased.

Considering that the start point of the sending period of each UE is different, a problem that different UEs occupy a same time domain resource also occurs in the V2V technology. As shown in FIG. 7, although the UE1 and the UE2 select different T-RPTs within a respective period, because the start point of the sending period of each UE is different, the two UEs occupy exactly a same time domain resource. This means that a conflict and a semi-duplex problem may still be caused even if the two UEs select the different T-RPTs.

It can be learned from the foregoing analysis that, regardless of whether the D2D technology or the V2V technology is applied to the vehicle-to-vehicle communication, a large quantity of problems still exist: 1. A quantity of time domain patterns is inappropriate: a quantity of time domain patterns in the D2D technology is excessively small, while a quantity of time domain patterns in the V2V technology is excessively large. 2. Although a quantity of bits of the T-RPT in the D2D technology is relatively small, the T-RPT is repeated four times within one period, indicating an excessively large quantity of transmission subframes; and although the T-RPT in the V2V technology indicates a relatively small quantity of transmission subframes within one period, a quantity of bits of the T-RPT is greatly increased. 3. In the V2V technology, although different UEs select different T-RPTs within a respective period, overlapping in time domain still occurs.

Embodiment 1

A concept for Embodiment 1 is: A time domain pattern is defined for only a half time length of a period of UE, a time domain resource required for a half quantity of transmission times is allocated for the time domain pattern with the half time length, and a time domain resource occupation manner within the other half period is obtained through calculation based on the defined half period.

A period in all the embodiments of the present application may be a time domain length of an SA resource pool plus a time domain length of a data resource pool, as shown in FIG. 2, or may be a time domain length of an SA resource pool or a time domain length of a data resource pool, as shown in FIG. 6.

The technical solution in Embodiment 1 of the present invention is described below with reference to FIG. 8.

The technical solution in this embodiment includes the following steps:

Step 801: A base station sends first control information to sending UE, where the first control information includes first time domain resource indication information.

Step 802: The sending UE determines second time domain resource indication information.

Step 803: The sending UE determines, based on the second time domain resource indication information determined in step 802, a time domain resource occupied within a double time length.

Step 804: The sending UE sends second control information to receiving UE, where the second control information includes the second time domain resource indication information determined in step 802.

Step 805: The receiving UE receives the second control information sent by the sending UE, and obtains the second time domain resource indication information.

Step 806: The sending UE sends data on the time domain resource determined in step 803.

Step 807: The receiving UE determines, based on the second time domain resource indication information obtained in step 805, the time domain resource occupied within the double time length, and receives the data on the determined time domain resource.

In step 801, the base station sends the first control information to sending UE1. In FIG. 8, two UEs, the UE1 and UE2, are shown as examples. There may be more UEs in an actual application scenario. The base station may send the first control information to the UE1 by using any existing signaling channel, for example, physical layer signaling (such as downlink control information (DCI) signaling), MAC layer signaling (such as a Medium Access Control control element (MAC CE)), and Radio Resource Control (RRC) layer signaling (such as a system message and RRC dedicated signaling). Alternatively, dedicated signaling may be newly designed for the control information. This is not limited in the present invention.

The first control information includes the first time domain resource indication information. Time domain resource indication information is used to indicate one or more time domain transmission resources within a time length. The one or more time domain transmission resources may be used to transmit data.

In addition, step 801 may be omitted in some implementations. In other words, in some implementations, the base station may not send the first control information to the UE1. In that case, the UE1 may autonomously select a time domain transmission resource based on a specific application scenario.

Figure 8:
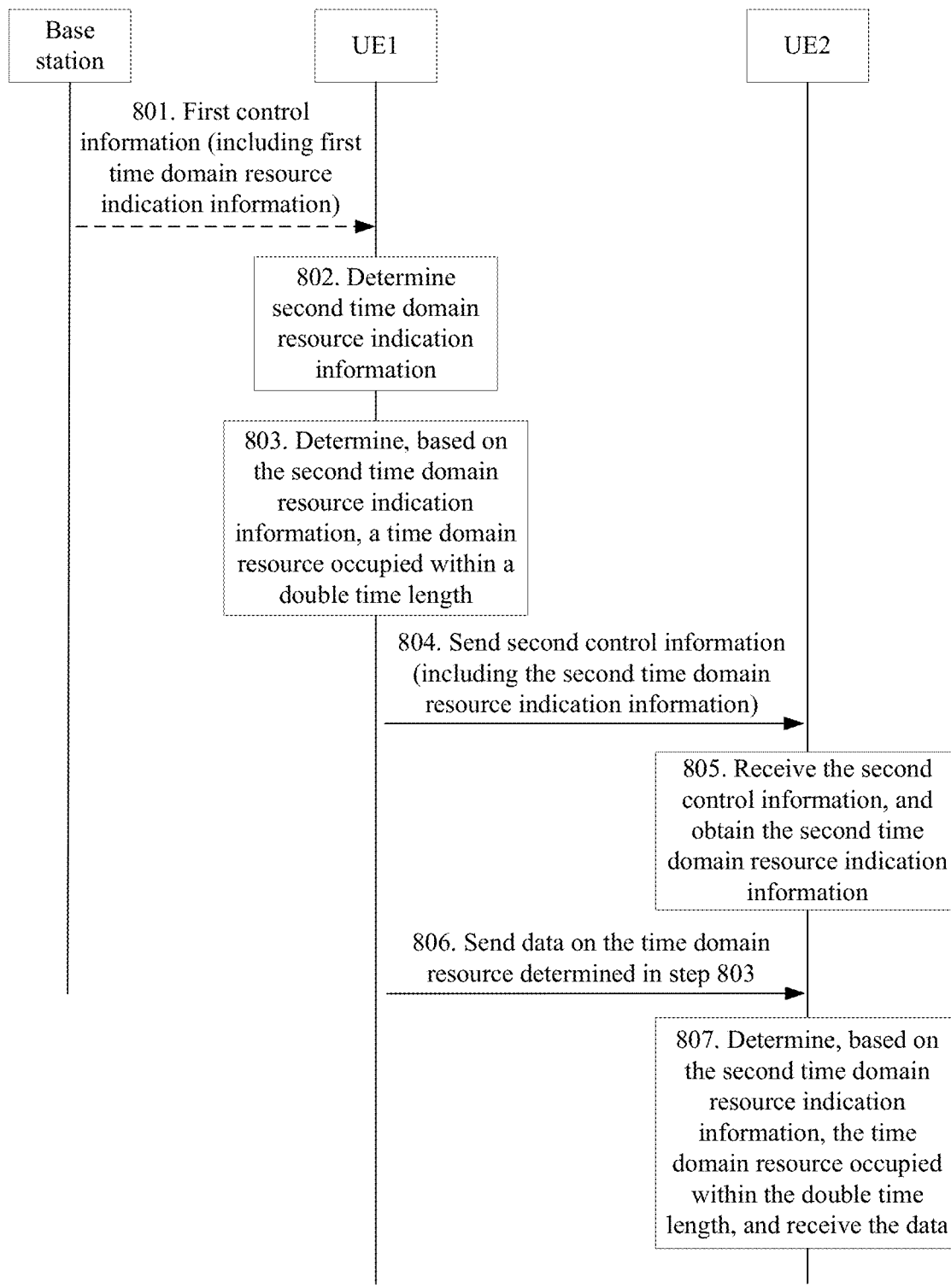
FIG. 8 is a schematic flowchart of a data transmission method according to an embodiment of this application.

In step 802, as shown in FIG. 8, the UE1 serves as the sending UE, and the UE2 serves as the receiving UE. The UE1, as a sender, determines the second time domain resource indication information in two cases: a case in which step 801 is not performed and a case in which step 801 is performed.

When step 801 is not performed, a plurality of pieces of time domain resource indication information has been preconfigured in the UE1, and the UE1 may autonomously select a piece of appropriate second time domain resource indication information based on a property (such as a data amount and a priority) of to-be-sent data and a wireless network channel status. A time domain resource indicated by the selected second time domain resource indication information is appropriate for transmitting the to-be-sent data.

When step 801 is performed, the UE1 receives the first control information from the base station, and obtains the first time domain resource indication information from the first control information. In this case, the UE1 may directly use the first time domain resource indication information received from the base station, and at that time, the second time domain resource indication information is the first time domain resource indication information. Certainly, the UE1 may alternatively compare the received first time domain resource indication information with the plurality of pieces of time domain resource indication information that have been preconfigured in the UE1, to select time domain resource indication information that is most appropriate for transmitting the to-be-sent data. In this case, the second time domain resource indication information may be different from the first time domain resource indication information.

Specifically, the first time domain resource indication information and the second time domain resource indication information in step 801 and step 802 are used to indicate a time domain resource occupied in each repeat transmission of a same MAC PDU (or transport block (TB)), and may be specifically T-RPTs. For example, a period is 40 ms, and four subframes need to be used for transmission within one period. An improvement of this embodiment is: the first time domain resource indication information and the second time domain resource indication information indicate a time domain resource with a half time length of the period, that is, a 20-ms time domain resource, and two subframes of the 20-ms time domain resource are used for data transmission.

In a possible implementation, a T-RPT is an index value, and a bitmap may be obtained through table lookup by using the index value. As shown in Table 2, the bitmap has a length of 20 bits and corresponds to a 20-ms time domain resource. There are two "1" in all bitmaps. Therefore, two subframes of the 20-ms time domain resource are used for data transmission. There are totally 190 types of bitmaps, and therefore the T-RPT may use an 8-bit index value. Table 2 listed in this application is merely an example table. A different table may be obtained through any modification and adjustment of a sequence of bitmaps in this table. This is not limited in the present invention.

TABLE 2

| Time resource pattern index (Time Resource Pattern Index) | Subframe indicator bitmap (subframe indicator bitmap) |
|---|---|
| 0 | (1, 1, 0, 0, 0, 0, 0, 0, 0, 0, 0, 0, 0, 0, 0, 0, 0, 0, 0, 0) |
| 1 | (1, 0, 1, 0, 0, 0, 0, 0, 0, 0, 0, 0, 0, 0, 0, 0, 0, 0, 0, 0) |
| 2 | (0, 1, 1, 0, 0, 0, 0, 0, 0, 0, 0, 0, 0, 0, 0, 0, 0, 0, 0, 0) |
| ... | ... |
| 188 | (0, 0, 0, 0, 0, 0, 0, 0, 0, 0, 0, 0, 0, 0, 0, 0, 0, 1, 0, 1) |
| 189 | (0, 0, 0, 0, 0, 0, 0, 0, 0, 0, 0, 0, 0, 0, 0, 0, 0, 0, 1, 1) |

The table may be preconfigured in the UE and the base station, for example, stored in a nonvolatile memory. If the table is preconfigured in the UE, the UE may autonomously select an appropriate bitmap to send data, and the base station does not need to send the first time domain resource indication information. In a specific selection process, the UE may determine a bitmap based on an index value, or may directly determine a bitmap. Both the bitmaps are equivalent. Content of the table may be constant, or may be variable. For example, the base station may configure the table for the UE by using signaling such as a system message, RRC layer signaling, or dedicated signaling. In this way, a more flexible mechanism can be implemented.

In the example in Table 2, the period being 40 ms is used for description. For other periods with lengths such as 10 ms and 20 ms, processing manners are the same, bitmap lengths of the periods are 5 ms and 10 ms, respectively, and a corresponding time domain resource has a half length of the period. In the example in Table 2, four subframes required for transmission within one period are used for description. For other quantities of transmission times, such as two times and eight times, processing manners are also the same, and there is one "1" and four "1" included in corresponding bitmaps, respectively. Details are not described herein.

All possible bitmaps when two subframes are selected for transmission within 20 ms are listed in Table 2. Optionally, the table may include only some bitmaps. For example, Table 2 includes the first 128 bitmaps. An advantage of this operation is that a length of the T-RPT can be reduced. For example, if a quantity of bitmaps is less than or equal to 128, the T-RPT may have a length of 7 bits. A disadvantage is that system performance may be affected because a subframe occupation status that can be indicated by the T-RPT is not complete.

In a possible implementation, only a bitmap whose first bit is 1 may be selected from the table for use.

Persons skilled in the art may perform selection based on a specific application scenario. This is not intended to be limited in the present disclosure.

Figure 11:
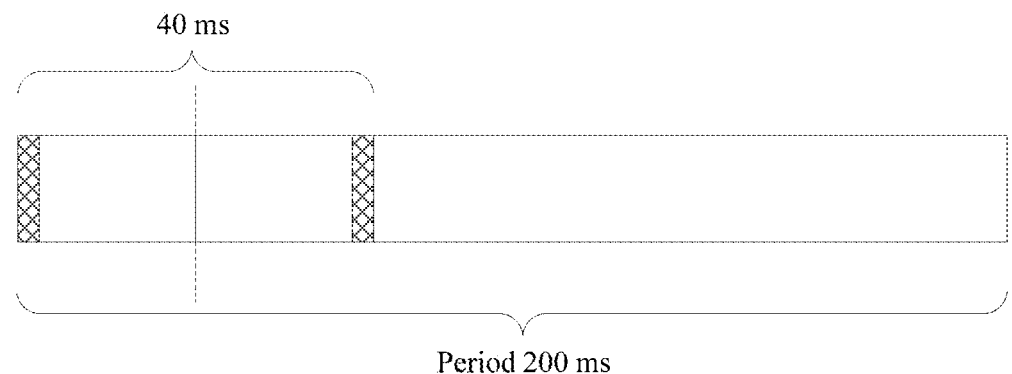
FIG. 11 is a schematic diagram of a bitmap applicable to a long period according to an embodiment of this application.

For a case in which a period is greater than 40 ms, the bitmap may also be applicable to a relatively small time range. As shown in FIG. 11, assuming that a period is 200 ms, the bitmap is applicable to the first 40 ms. A parameter indicating which time segment the bitmap is specifically applicable to may be preconfigured in the UE, or may be configured by the base station for the UE. For example, the base station may configure the parameter for the UE by using RRC layer signaling (such as a system message and RRC dedicated signaling), MAC layer signaling (a MAC CE), or physical layer signaling (such as DCI).

In step 803, after the second time domain resource indication information is determined in step 802, the sending UE1 needs to determine the time domain resource occupied within the double time length, and generate the second control information. The second control information includes the second time domain resource indication information. The UE1 generates a data packet. The data packet may be sent on the time domain resource that is determined to be occupied within the double time length.

The example in Table 2 is still used for description, and it is assumed that the T-RPT determined by the UE1 in step 802 is 0. The UE1 learns, by using the T-RPT, that a bitmap is (1,1,0,0,0,0,0,0,0,0,0,0,0,0,0,0,0,0,0,0). The bitmap indicates the first two subframes of the 20-ms time domain resource are used for data transmission.

Figure 9:
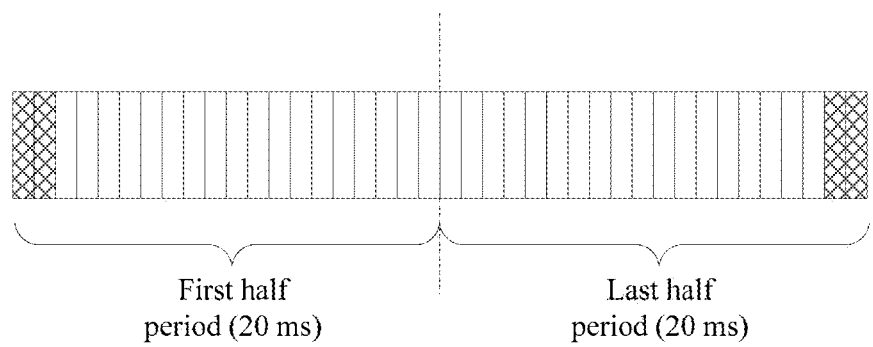
FIG. 9 is a schematic diagram of determining, by UE, a time domain resource occupied within a double time length according to an embodiment of this application.

In step 803, the UE1 needs to determine, based on the T-RPT, which subframes of a 40-ms time domain resource are used for data transmission. As shown in FIG. 9, in a possible implementation, the UE1 uses the bitmap (1,1,0,0, 0,0,0,0,0,0,0,0,0,0,0,0,0,0,0,0) as a time domain resource of the first 20 ms, then reverses the bitmap, to obtain (0,0,0, 0,0,0,0,0,0,0,0,0,0,0,0,0,0,0,1,1), and uses the reversed bitmap as a time domain resource of the last 20 ms. In another possible implementation, the UE1 uses the bitmap as a time domain resource of the first 20 ms. In other words, the first two subframes of the first 20 ms are used for data transmission. Subframes of a time domain resource of the last 20 ms that are used for data transmission are opposite to that of the first 20 ms. In other words, the last two subframes of the last 20 ms are used for data transmission. In this way, a determining result is that the first half period and the last half period are in mirror symmetric. Certainly, the bitmap may alternatively be first used as the time domain resource of the last 20 ms, and then reversed, to obtain the time domain resource of the first 20 ms. Details are not described herein.

In a possible implementation, the second control information generated by the UE1 in step 803 may be SA and may be transmitted in an SA resource pool. The SA includes the T-RPT used as the second time domain resource indication information, and the data packet generated by the UE1 in step 803 is data corresponding to the SA.

In step 804, the UE1 sends, to the receiving UE2, the second control information generated in step 803. The UE1 may send the second control information by using any existing signaling channel or dedicated signaling newly designed for the control information. This is not limited in the present invention.

In step 805, the UE2, as a receiver, receives the second control information from the UE1, and a processor or another module of the UE2 obtains the second time domain resource indication information from the second control information.

In an optional implementation, the second control information may be SA and transmitted to the UE2 in an SA resource pool in step 804; and the second time domain resource indication information is the T-RPT.

In step 806, a transmitter of the UE1 sends the data to the UE2 on the time domain resource determined in step 803.

In step 807, the processor or another unit of the UE2 determines, based on the second time domain resource indication information obtained in step 805, the time domain resource occupied within the double time length. A manner of the determining is exactly the same as a manner of determining, by the UE1, the time domain resource occupied within the double time length in step 803. Details are not described herein again. The processor of the UE2 controls the receiver to receive the data from the determined time domain resource.

Optionally, step 804 and step 806 may be performed simultaneously, namely, occur in a same subframe; and step 805 and step 807 may be performed simultaneously.

Optionally, considering a case in which a quantity of subframes that need to be used for transmission within one period is variable, in a possible implementation, one table is independently defined for each quantity of transmission times. The period 40 ms is still used as an example. For example, when there are four transmissions within the entire period (or two transmissions within a half period), the T-RPT needs to be obtained by looking up Table 2. When there are two transmissions within the entire period (or one transmission within the half period), the T-RPT needs to be obtained by looking up Table 3. When there is one transmission within the entire period, the T-RPT needs to be obtained by looking up Table 4. A bitmap in Table 3 has a length of 20 bits and corresponds to a 20-ms time domain resource. There is one "1" in all bitmaps. Therefore, one subframe of the 20-ms time domain resource is used for data transmission, and there are totally 20 types of bitmaps. A bitmap in Table 4 has a length of 40 bits, and corresponds to a 40-ms time domain resource. There is one "1" in all bitmaps. Therefore, one subframe of the 40-ms time domain resource is used for data transmission, and there are totally 40 types of bitmaps.

TABLE 3

| T-RPT | Subframe indicator bitmap |
|---|---|
| 0 | (1, 0, 0, 0, 0, 0, 0, 0, 0, 0, 0, 0, 0, 0, 0, 0, 0, 0, 0, 0) |
| 1 | (0, 1, 0, 0, 0, 0, 0, 0, 0, 0, 0, 0, 0, 0, 0, 0, 0, 0, 0, 0) |
| 2 | (0, 0, 1, 0, 0, 0, 0, 0, 0, 0, 0, 0, 0, 0, 0, 0, 0, 0, 0, 0) |
| ... | ... |
| 18 | (0, 0, 0, 0, 0, 0, 0, 0, 0, 0, 0, 0, 0, 0, 0, 0, 0, 0, 1, 0) |
| 19 | (0, 0, 0, 0, 0, 0, 0, 0, 0, 0, 0, 0, 0, 0, 0, 0, 0, 0, 0, 1) |

TABLE 4

| T-RPT | Subframe indicator bitmap |
|---|---|
| 0 | (1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 1 | (0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 2 | (0, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| ... | ... |
| 38 | (0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 0) |
| 39 | (0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1) |

When there are a plurality of bitmaps, in step 802, when determining the time domain resource indication information, the UE1 not only needs to determine the T-RPT, but also needs to determine which bitmap the T-RPT is located in. In step 803, the UE1 determines, based on a corresponding bitmap, the time domain resource occupied within the double time length. It should be noted that, because an occupation status of the time domain resource within the entire period is defined in Table 4, the bitmap in Table 4 is directly used, without a need of extension. In step 804, the second control information sent by the UE1 not only includes the T-RPT, but also includes information indicating a quantity of transmission times within the entire period, or includes information indicating which bitmap is to be used. In step 805, when receiving the second control information, the UE2 not only receives the T-RPT, but also receives the information indicating the quantity of transmission times within the entire period, or receives the information indicating which bitmap is to be used. In step 807, the UE2 may determine which table the T-RPT is to be used for, to receive the data on the correct time domain resource.

Optionally, as shown in Table 5, the foregoing plurality of tables corresponding to different quantities of transmission times may be combined into one large table, and T-RPTs are numbered in order. The quantity of transmission times may be directly obtained based on the T-RPT. For example, when the T-RPT ranges from 0 to 189, it indicates that there are four transmissions within the entire period (two transmissions within the half period). When the T-RPT ranges from 190 to 209, it indicates that there are two transmissions within the entire period (one transmission within the half period). When the T-RPT ranges from 210 to 249, it indicates that there is one transmission within the entire period. In an implementation shown in Table 5, a T-RPT has a length of 8 bits, and no additional indication is required.

TABLE 5

| T-RPT | Bitmap |
|---|---|
| 0 | (1, 0, 1, 0, 0, 0, 0, 0, 0, 0, 0, 0, 0, 0, 0, 0, 0, 0, 0, 0) |
| 1 | (1, 1, 0, 0, 0, 0, 0, 0, 0, 0, 0, 0, 0, 0, 0, 0, 0, 0, 0, 0) |
| 2 | (0, 1, 1, 0, 0, 0, 0, 0, 0, 0, 0, 0, 0, 0, 0, 0, 0, 0, 0, 0) |
| ... | ... |
| 188 | (0, 0, 0, 0, 0, 0, 0, 0, 0, 0, 0, 0, 0, 0, 0, 0, 0, 1, 0, 1) |
| 189 | (0, 0, 0, 0, 0, 0, 0, 0, 0, 0, 0, 0, 0, 0, 0, 0, 0, 0, 1, 1) |
| 190 | (1, 0, 0, 0, 0, 0, 0, 0, 0, 0, 0, 0, 0, 0, 0, 0, 0, 0, 0, 0) |
| 191 | (0, 1, 0, 0, 0, 0, 0, 0, 0, 0, 0, 0, 0, 0, 0, 0, 0, 0, 0, 0) |
| 192 | (0, 0, 1, 0, 0, 0, 0, 0, 0, 0, 0, 0, 0, 0, 0, 0, 0, 0, 0, 0) |
| ... | ... |
| 208 | (0, 0, 0, 0, 0, 0, 0, 0, 0, 0, 0, 0, 0, 0, 0, 0, 0, 0, 1, 0) |
| 209 | (0, 0, 0, 0, 0, 0, 0, 0, 0, 0, 0, 0, 0, 0, 0, 0, 0, 0, 0, 1) |
| 210 | (1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 211 | (0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 212 | (0, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| ... | ... |
| 248 | (0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 0) |
| 249 | (0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1) |

In a technical solution provided by Embodiment 1, only a time domain pattern with a half time length of a period is defined, so that a quantity of time domain patterns in a system is greatly decreased. The period 40 ms is used as an example. Referring to Table 2, there are totally $$\binom{20}{2} = 190$$

different time domain patterns. After time domain patterns with the half time length are extended and applied to the entire period, there are still 190 time domain patterns. Then, if it is considered that there are 40 different start points, a total quantity of time domain patterns is 190×40=7600. The quantity is greater than a quantity in a D2D technology and less than a quantity in an existing V2V technology, and is enough for a vehicle-to-vehicle communication scenario.

In addition, in the technical solution provided Embodiment 1, if the T-RPT is used as the time domain resource indication information, the T-RPT requires totally $\lceil \log_2 190 \rceil = 8$ bits. Compared with 7 bits in the D2D technology, only overheads of one bit are increased; and compared with 17 bits in the existing V2V technology, the quantity is greatly decreased.

Figure 10:
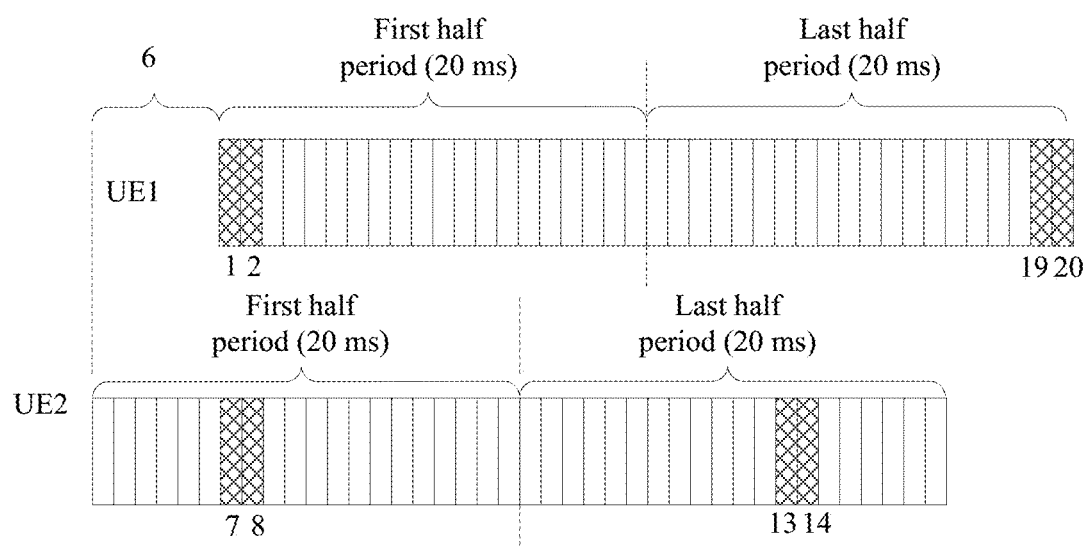
FIG. 10 is a schematic diagram of resolving a problem that different UEs occupy exactly a same time domain resource in an entire period according to an embodiment of this application.

In addition, in the technical solution provided by Embodiment 1, a time domain pattern with the first half period and a time domain pattern with the last half period are set in a mirror symmetric manner. This resolves a problem that different UEs occupy exactly a same time domain resource within the entire period. For example, in FIG. 10, a bit pattern indicated by a bitmap of UE 1 is (1,1,0,0,0,0,0,0,0, 0,0,0,0,0,0,0,0,0,0,0). The $1^{st}$ and $2^{nd}$ subframes are occupied within the first half period, and the $19^{th}$ and $20^{th}$ subframes are occupied within the last half period. A bit pattern indicated by a bitmap of UE 2 is (0,0,0,0,0,0,1,1,0, 0,0,0,0,0,0,0,0,0,0,0). The 7th and 8th subframes are occupied within the first half period, and the $13^{th}$ and $14^{th}$ subframes are occupied within the last half period. When it is considered that a start point of a sending period of each UE is different, even if subframes occupied by the UE 1 are the same as subframes occupied by the UE 2 within the first half period, subframes occupied by the UE 1 are not all the same as subframes occupied by the UE 2 within the last half period because of mirror symmetric setting in Embodiment 1. This improves system performance.

Optionally, Embodiment 1 may have a variant: In step 803, when determining the time domain resource occupied within the double time length, the sending UE1 reuses the resource indication information two times. In other words, an occupation status of a time domain resource of the last half period is obtained through reproduction or panning from an occupation status within the first half period. Correspondingly, in step 807, the receiving UE2 determines, according to a same rule, the time domain resource occupied within the double time length. In this variant embodiment, the following technical effects can also be achieved: The time domain patterns in the system are decreased, and a small quantity of bits of the T-RPT is increased.

Embodiment 2

Based on the technical solution in Embodiment 1, a time length that can be indicated by the second time domain resource indication information determined by the sending UE1 in step 803 should be a half of the period. In a scenario in which a period is relatively long, the following case may exist: The second time domain resource indication information, for example, may be specifically the T-RPT, has a relatively large quantity of bits, and therefore occupies a large quantity of system resources. In addition, the technical solution in Embodiment 1 is not applicable to a scenario in which a transmission time length is variable.

In Embodiment 2, an improvement is made based on Embodiment 1, and is applicable to the scenario in which the period is relatively long. It is assumed that the period is 200 ms. In Embodiment 2, step 803 and step 807 in Embodiment 1 are improved, and remaining steps are the same as those in Embodiment 1. The following describes only steps that are improved in Embodiment 2 in comparison with Embodiment 1.

In an example, a bitmap length in Embodiment 2 is the same as a bitmap length in Table 2 in Embodiment 1, and is still 20 bits, and the first time domain resource indication information and the second time domain resource indication information in Embodiment 2, namely, the quantity of bits of the T-RPT, still remains 8 bits.

Figure 12:
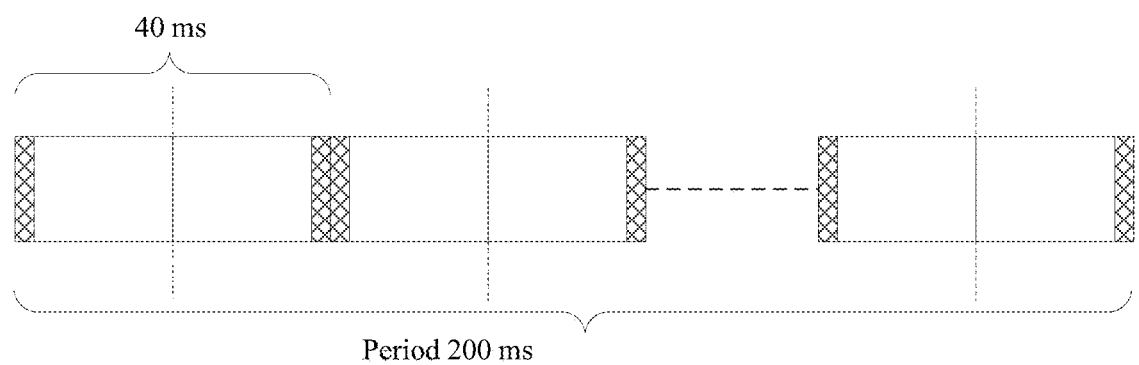
FIG. 12 is a schematic diagram of a bitmap applicable to a long period according to Embodiment 2 of this application.

As shown in FIG. 12, in step 803, the sending UE1 first determines, in a manner in Embodiment 1, a time domain resource occupied within a double time length, repeats the foregoing process within a remaining time length, and determines a time domain resource occupied within a subsequent double time length, until the period ends.

In step 807, after obtaining the second time domain resource indication information, the receiving UE2 determines a time domain resource occupation manner by using a method the same as a method used in step 803.

In FIG. 12, in a system, a period is 200 ms, a bitmap length is 20 bits, and a period length is an integral multiple of the bitmap length. For a non-integral multiple scenario, truncation may be performed at the end of the period. Details are not described herein.

In the foregoing technical solution, the time domain resource indication information needs to be applied to the entire period by default. A variant of Embodiment 2 is: The time domain resource indication information is not applied to the entire period, but applied to only some time domain resources within the entire period. A specific time length to which the time domain resource is applied may be sent by the base station to the UE by using a system message or a dedicated message, or a corresponding time length may be selected by the sending UE1 based on a priority, a message type, and the like of the sending UE1. The UE1 may send the time length to the UE2 by using the second control information (SA data). The case is described below.

A second scenario in Embodiment 2 is an improvement based on Embodiment 1. It is assumed that the period of the system is 200 ms. In the second scenario in Embodiment 2, step 803, step 804, step 805, and step 807 in Embodiment 1 are improved, and remaining steps are the same as those in Embodiment 1. The following describes only steps that are improved in the second scenario of Embodiment 2 in comparison with Embodiment 1.

Figure 13:
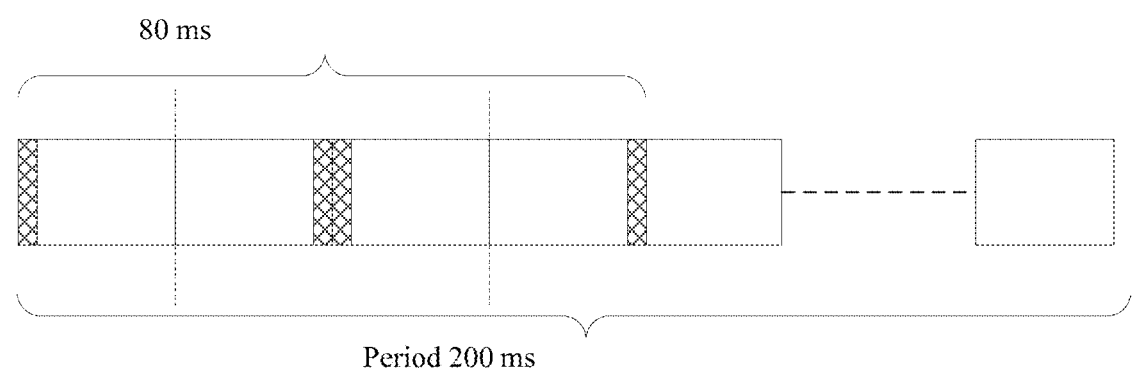
FIG. 13 is a schematic diagram of another bitmap applicable to a long period according to Embodiment 2 of this application.

As shown in FIG. 13, in step 803, the sending UE1 selects an applicable time length based on a priority, a message type, and the like of the sending UE1. In an example in FIG. 13, the UE1 selects time domain resource indication information that is applied to a time length 80 ms. The UE1 determines, in the foregoing manner, a time domain resource occupied within the time length 80 ms.

In step 804, the sending UE1 sends the second control information to the receiving UE2. The second control information includes the second time domain resource indication information determined in step 802 and the applicable time length, namely, 80 ms, determined by the UE1 in step 803. The second control information may be SA information or SA data, and the applicable time length is sent to the UE2 by using the SA information or the SA data.

In step 805, the receiving UE2 receives the second control information, to not only obtain the second time domain resource indication information, but also obtain the applicable time length.

In step 807, after obtaining the second time domain resource indication information, the receiving UE2 determines a time domain resource occupation manner by using a method the same as a method used in step 803.

In FIG. 13, in a system, a period is 200 ms, a bitmap length is 20 bits, and an applicable time length is an integral multiple of the bitmap length. For a non-integral multiple scenario, truncation may be performed at the end of the period. In the example in FIG. 13, the applicable time length is 80 ms. In a scenario in which the applicable time length is less than a double bitmap length, namely, less than 40 ms, truncation may also be performed at the end of the period. Details are not described herein.

In the embodiment in FIG. 13, a method for determining a time domain resource occupation manner by the UE1 and the UE2 may be a manner shown in FIG. 13, or certainly may be any other manners, provided that the time domain resource occupation manner within the applicable time length can be determined.

An effect in Embodiment 2 is similar to that in Embodiment 1, and a technical effect that occupied time domain resource types in the system are decreased and a small quantity of bits of the T-RPT is increased can be achieved. In addition, the technical solution is applicable to the scenario in which the transmission time length is variable.

Embodiment 3

In technical solutions provided by Embodiment 1 and Embodiment 2, the period is a fixed value. However, in a different scenario or a different time segment, a system may require a different period length. Therefore, a disadvantage is that the technical solutions in Embodiments 1 and 2 are not flexible enough.

In Embodiment 3, an improvement is made based on Embodiment 1 and Embodiment 2, and is applicable to a scenario in which a period is variable. In Embodiment 3, step 803, step 804, and step 805 in Embodiment 1 and Embodiment 2 are improved, and remaining steps are the same as those in Embodiment 1 and Embodiment 2. The following describes only steps that are improved in Embodiment 3 in comparison with Embodiment 1 and Embodiment 2.

In step 803, the sending UE1 further needs to determine a period length. When the sending UE1 generates the second control information, the second control information not only includes the second time domain resource indication information, but also includes the period length.

In step 804, the sending UE1 sends the second control information to the receiving UE2. The second control information includes the second time domain resource indication information and the period length that are determined in step 802. The second control information may be SA information or SA data, and the period length is sent to the UE2 by using the SA information or the SA data.

In step 805, the UE2, as a receiver, receives the second control information from the UE1, and a processor or another module of the UE2 obtains the second time domain resource indication information and the period length from the second control information, and sets the obtained period length as a period length of current transmission.

Based on the effects in Embodiment 1 and Embodiment 2, the following beneficial effect can further be achieved in Embodiment 3: The period length is variable, and the technical solution is applicable to a more complex transmission scenario.

Embodiment 4

In technical solutions provided by Embodiments 1 to 3, bitmap lengths and time lengths to which a bitmap is applicable are the same. To be specific, a 20-bit bitmap is applicable to a 20-ms time domain resource. However, in a different scenario or a different time segment, a system may require the bitmap to be applicable to a different time length. For example, the 20-bit bitmap is applicable to a time domain resource within 10 ms. Therefore, a disadvantage is that the technical solutions in Embodiments 1 to 3 are not flexible enough.

In Embodiment 4, an improvement is made based on Embodiments 1 to 3: The bitmap may be applicable to a different time length. In Embodiment 4, steps 803, 804, 805, and 806 in Embodiments 1 to 3 are improved, and remaining steps are the same as those in Embodiments 1 to 3. The following describes only steps that are improved in Embodiment 4 in comparison with Embodiments 1 to 3.

In an example, a bitmap length in Embodiment 4 is the same as the bitmap length in Table 2 in Embodiment 1, and is still 20 bits.

Figure 14:
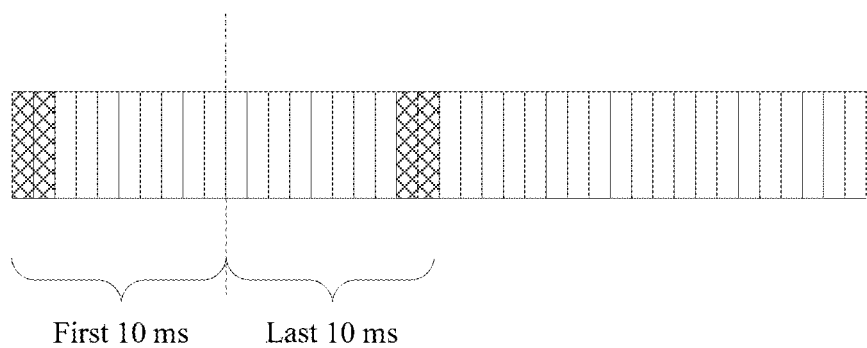
FIG. 14 is a schematic diagram of truncating a bitmap for use according to an embodiment of this application.

In correspondence with FIG. 9 in Embodiment 1, as shown in FIG. 14, in step 803 in Embodiment 4, the sending UE1 first determines a time length to which a bitmap is applicable. The UE1 learns that the bitmap is (1,1,0,0,0,0, 0,0,0,0,0,0,0,0,0,0,0,0,0,0), and the bitmap is not applicable to 20 ms. Instead, the bitmap, for example, may be applicable to 10 ms. In this case, it may be considered that the UE1 truncates the bitmap to (1,1,0,0,0,0,0,0,0,0) for use. The UE1 determines a time domain resource occupied within a double time length, namely, applies the truncated bitmap (1,1,0,0,0,0,0,0,0,0) within the double time length 20 ms.

In step 804, the sending UE1 sends the second control information to the receiving UE2. The second control information includes the second time domain resource indication information and a target time length that are determined in step 802, namely, 10 ms in an example in FIG. 14. In this case, the target time length means a time length obtained after the bitmap is truncated. The second control information may be SA information or SA data, and the target time length is sent to the UE2 by using the SA information or the SA data.

In step 805, the UE2, as a receiver, receives the second control information from the UE1, and a processor or another module of the UE2 obtains the second time domain resource indication information and the target time length from the second control information.

In step 807, after obtaining the second time domain resource indication information, the receiving UE2 sets the obtained target time length as a time length to which the bitmap is applied, and determines a time domain resource occupation manner by using a method that is the same as a method used in step 803, as shown in FIG. 14.

10 ms is used as an example for description in the embodiment in FIG. 14. For another time length, a processing manner is similar. Details are not described herein.

Optionally, as shown in FIG. 14, a meaning of the target time length may be further set as: a time length obtained after the bitmap is truncated and is extended once. In this case, the target time length is 20 ms. The UE1 learns that a bitmap with a length of 10 ms is required. However, the bitmap (1,1,0,0,0,0,0,0,0,0,0,0,0,0,0,0,0,0,0,0) is 20 ms. Therefore, the UE1 truncates the bitmap to (1,1,0,0,0,0,0,0, 0,0) for use. Similarly, after receiving the target time length 20 ms, the UE2 also performs same determining and a same operation.

Table 2 lists all possible bitmaps when two subframes are selected within 20 ms for transmission. For example, after truncation described in Embodiment 4 is performed, some bitmaps in the table may still be used, and remaining bitmaps may not be used. A specific bitmap that may be used may be determined based on a specific application scenario.

Based on the effects in Embodiments 1 to 3, the following beneficial effect can further be achieved in Embodiment 4: a length to which the bitmap is applicable is variable, and the technical solution is applicable to a more complex transmission scenario.

Embodiment 5

Figure 8A:
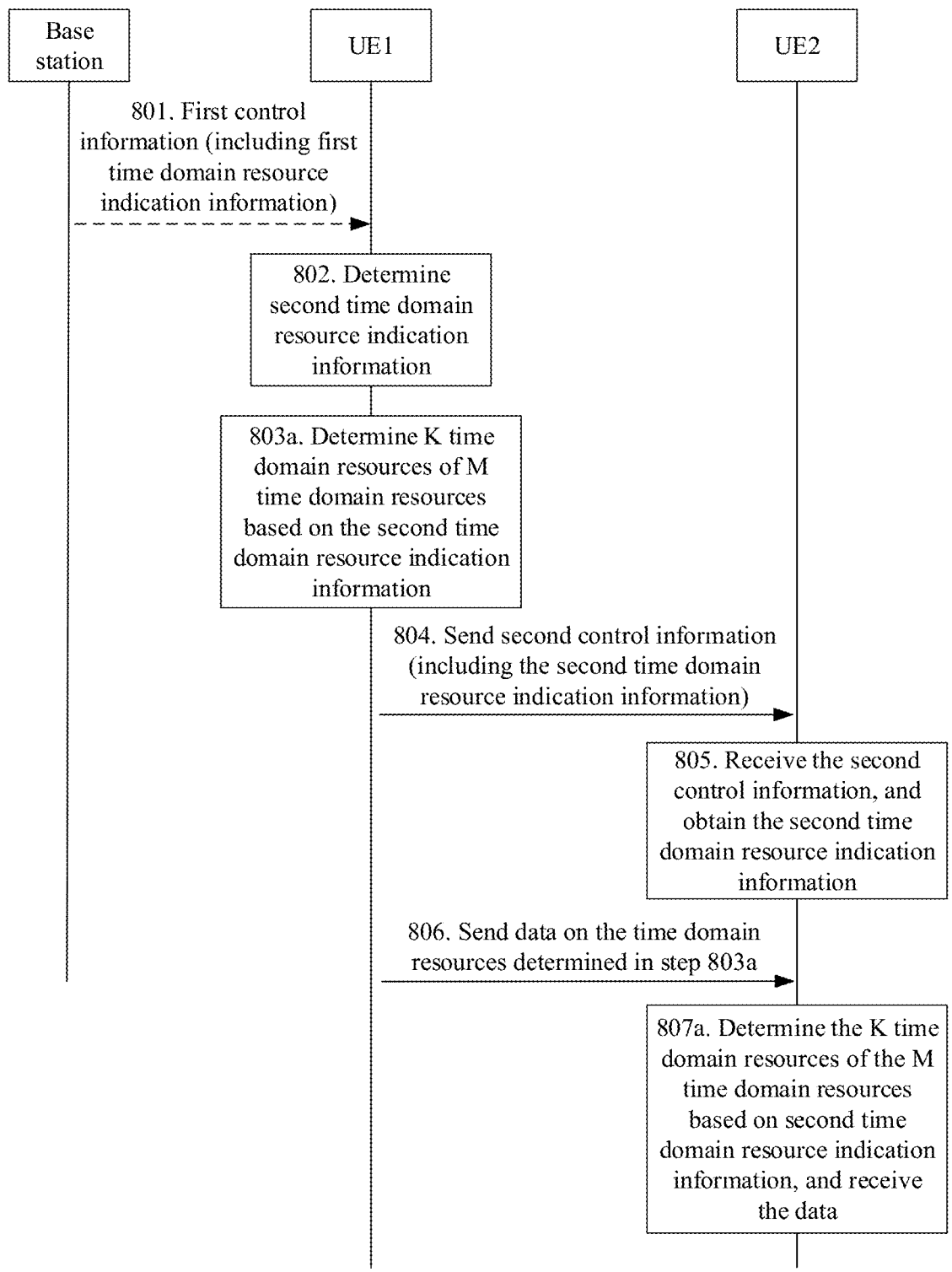
FIG. 8a is a schematic flowchart of another data transmission method according to an embodiment of this application.

In Embodiment 5, an improvement is made based on Embodiments 1 to 4. A location of the first time domain resource is fixed, so that only a location of a remaining time domain resource needs to be indicated. Therefore, implementation is more flexible, and a delay requirement of data transmission can be better satisfied. As shown in FIG. 8a, in Embodiment 5, step 803 and step 807 in Embodiments 1 to 4 are improved, to obtain new step 803a and step 807a, and remaining steps are the same as those in Embodiments 1 to 4. The following describes only steps that are improved in embodiment 5 in comparison with Embodiments 1 to 4.

In step 803a, the sending UE determines K time domain resources of M time domain resources based on the second time domain resource indication information determined in step 802. The first of the K time domain resources is the first of the M time domain resources, remaining K−1 of the K time domain resources are a subset of remaining M−1 of the M time domain resources, M is a positive integer, K is a positive integer, K is less than or equal to M, and K is a quantity of transmission times of one piece of data.

In step 807a, after obtaining the second time domain resource indication information, the receiving UE determines a time domain resource occupation manner by using a method the same as a method used in step 803a. Details are not described herein again.

Optionally, that K is a positive integer further includes: the sending user equipment receives K from the base station; or the sending user equipment autonomously selects K; or K is preconfigured on the sending user equipment.

Optionally, that M is a positive integer further includes: the sending user equipment receives M from the base station; or the sending user equipment autonomously selects M; or M is preconfigured on the sending user equipment.

Optionally, the M time domain resources further include: the M time domain resources may be continuous or discontinuous in time domain.

Optionally, M may be further a delay that needs to be satisfied when the data is transmitted.

In this embodiment, that M=40 and K=4 is used as an example for description.

Figure 18:
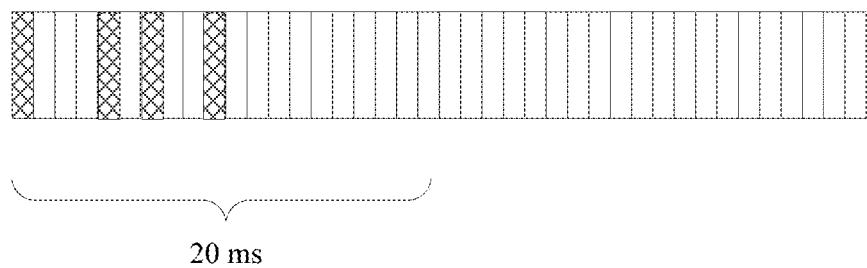
FIG. 18 is a schematic diagram of bitmap transmission according to an embodiment of this application.

In a possible implementation, as shown in FIG. 18, in step 803a, the sending UE selects, within 40 ms, four subframes to transmit a same TB four times. The first selected subframe is the first subframe of 40 ms, and remaining three subframes are randomly selected within remaining 39 ms. In step 807a, a behavior of the receiving UE is similar. Details are not described herein.

Specifically, Table 2 in Embodiment 1 may be further improved, as shown in Table 6. Table 6 includes all bitmaps whose first bits are 1, whose lengths are 40 bits, and that include four "1". Further, because the first bit needs to be 1, the first bit may be omitted in the bitmap, as shown in Table 7. Table 7 includes all bitmaps that include three "1" and whose lengths are 39 bits. Each bitmap is obtained by deleting the first bit 1 of the bitmap in a corresponding row in Table 6.

TABLE 6

| Time resource pattern index (Time Resource Pattern Index) | Subframe indicator bitmap (subframe indicator bitmap) |
| --- | --- |
| 0 | (1, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 1 | (1, 1, 1, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 2 | (1, 1, 0, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |

TABLE 6-continued

| Time resource pattern index (Time Resource Pattern Index) | Subframe indicator bitmap (subframe indicator bitmap) |
| --- | --- |
| 3 | (1, 0, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 4 | (1, 1, 1, 0, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| ... | ... |
| 9137 | (1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 0, 1, 1) |
| 9138 | (1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 1, 1) |

TABLE 7

| Time resource pattern index (Time Resource Pattern Index) | Subframe indicator bitmap (subframe indicator bitmap) |
| --- | --- |
| 0 | (1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 1 | (1, 1, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 2 | (1, 0, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 3 | (0, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| 4 | (1, 1, 0, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0) |
| ... | ... |
| 9137 | (0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 0, 1, 1) |
| 9138 | (0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 1, 1) |

In another possible implementation, similar to Embodiment 1, in step 803a, the sending UE selects, within the first 20 ms, two subframes to transmit a same TB for the first two times. The first selected subframe is the first subframe of the first 20 ms, and the second subframe is randomly selected within remaining 19 ms of the first 20 ms. A time domain resource selected within the last 20 ms is obtained by reversing or reproducing a time domain resource selected within the first 20 ms. In step 807a, a behavior of the receiving UE is similar. Details are not described herein.

Specifically, Table 2 in Embodiment 1 may be further improved, as shown in Table 8. Table 8 includes all bitmaps whose first bits are 1, whose lengths are 20 bits, and that include two "1". Further, because the first bit needs to be 1, the first bit may be omitted in the bitmap, as shown in Table 9. Table 9 includes all bitmaps that include one "1" and whose lengths are 19 bits. Each bitmap is obtained by deleting the first bit 1 of the bitmap in a corresponding row in Table 8. In this manner, the table includes only 19 types of different bitmaps, and only five bits are required for indication.

TABLE 8

| Time resource pattern index (Time Resource Pattern Index) | Subframe indicator bitmap (subframe indicator bitmap) |
| --- | --- |
| 0 | (1, 1, 0, 0, 0, 0, 0, 0, 0, 0, 0, 0, 0, 0, 0, 0, 0, 0, 0, 0) |
| 1 | (1, 0, 1, 0, 0, 0, 0, 0, 0, 0, 0, 0, 0, 0, 0, 0, 0, 0, 0, 0) |
| 2 | (1, 0, 0, 1, 0, 0, 0, 0, 0, 0, 0, 0, 0, 0, 0, 0, 0, 0, 0, 0) |
| ... | ... |

TABLE 8-continued

| Time resource pattern index (Time Resource Pattern Index) | Subframe indicator bitmap (subframe indicator bitmap) |
|---|---|
| 17 | (1, 0, 0, 0, 0, 0, 0, 0, 0, 0, 0, 0, 0, 0, 0, 0, 0, 0, 1, 0) |
| 18 | (1, 0, 0, 0, 0, 0, 0, 0, 0, 0, 0, 0, 0, 0, 0, 0, 0, 0, 0, 1) |

TABLE 9

| Time resource pattern index (Time Resource Pattern Index) | Subframe indicator bitmap (subframe indicator bitmap) |
|---|---|
| 0 | (1, 0, 0, 0, 0, 0, 0, 0, 0, 0, 0, 0, 0, 0, 0, 0, 0, 0, 0, 0) |
| 1 | (0, 1, 0, 0, 0, 0, 0, 0, 0, 0, 0, 0, 0, 0, 0, 0, 0, 0, 0, 0) |
| 2 | (0, 0, 1, 0, 0, 0, 0, 0, 0, 0, 0, 0, 0, 0, 0, 0, 0, 0, 0, 0) |
| ... | ... |
| 17 | (0, 0, 0, 0, 0, 0, 0, 0, 0, 0, 0, 0, 0, 0, 0, 0, 0, 0, 1, 0) |
| 18 | (0, 0, 0, 0, 0, 0, 0, 0, 0, 0, 0, 0, 0, 0, 0, 0, 0, 0, 0, 1) |

Optionally, considering a case in which a quantity K of transmission times is variable, similar to Embodiment 1, one table may be independently defined for each K, or a plurality of tables corresponding to different Ks may be combined into one large table, and numbering is performed in order.

In Embodiment 5, the location of the first time domain resource is fixed, so that only the location of the remaining time domain resource needs to be indicated. Therefore, a quantity of bits required by time domain indication information is reduced, system resources are saved, implementation is more flexible, and the delay requirement of the data transmission can be better satisfied.

Embodiment 6

In the technical solutions provided Embodiments 1 to 5, a T-RPT is specifically an index value, and a bitmap may be obtained through query by using the index value and by querying a table such as Table 2. In this manner, both the base station side and the UE side need to occupy particular storage space to store the table. Consequently, the technical solutions in Embodiments 1 to 5 have a problem that excessively much storage space is occupied.

In Embodiment 6, an improvement is made based on Embodiments 1 to 5. The base station and the UE obtain a relationship between a T-RPT and a bitmap through calculation, and do not need to store a table, thereby saving storage space.

In Embodiment 6, step 803 and step 807 in Embodiments 1 to 5 are improved, and remaining steps are the same as those in Embodiments 1 to 5. The following describes only steps that are improved in Embodiment 6 in comparison with Embodiments 1 to 5.

Figure 15:
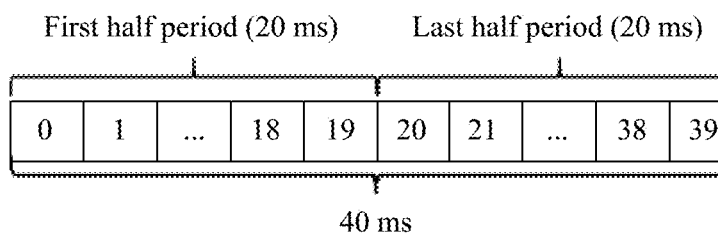
FIG. 15 is a schematic diagram of obtaining a T-RPT and a bitmap through calculation according to an embodiment of this application.

As shown in FIG. 15, that a period is 40 ms and four transmissions are performed within each period is still used as an example for description. The first half period is 20 ms and is marked by sequence numbers 0 to 19, respectively, and the last half period is marked by 20 to 39.

Assuming that two transmissions are performed in subframes whose sequence numbers are $t_1$ and $t_2$ within the first half period, respectively, where $t_1, t_2 \in \{0, 1, \ldots, 19\}$, a T-RPT may be defined as $$\text{index} = \binom{t_2}{2} + \binom{t_1}{1},$$

where $$\binom{n}{k}$$

is used to calculate a combinatorial number, a calculation manner is $$\binom{n}{k} = \begin{cases} 0, & n < k \\ \dfrac{n!}{k!(n-k)!}, & n \geq k \end{cases},$$

and n, k are non-negative integers.

When a time domain location (such as a bitmap) of each transmission is known, a corresponding T-RPT may be calculated. On the contrary, when a T-RPT is known, a time domain location (such as a bitmap) of each transmission can also be calculated. Specifically, assuming that $t_1=1$, $t_2=2$ and a bitmap form obtained through conversion is (0,1,1,0,0,0, 0,0,0,0,0,0,0,0,0,0,0,0,0,0), a corresponding T-RPT is $$\binom{2}{2} + \binom{1}{1} = 2.$$

On the contrary, after a T-RPT being 2 is obtained, corresponding $t_1$ and $t_2$ (or a bitmap) can also be calculated by using $$2 = \binom{t_2}{2} + \binom{t_1}{1}.$$

In a possible calculation manner, $$\binom{i_2}{2}, i_2 = 0, 1, \ldots, 19$$

is calculated sequentially, to find $i_2$, so that $$\binom{i_2}{2} \leq \text{index} < \binom{i_2+1}{2}.$$

In this case, $t_2=i_2$. Then, assuming $$\text{index}_1 = \text{index} - \binom{i_2}{2},$$

and $$\binom{i_1}{1}, i_1 = 0, 1, \ldots, 19$$

is calculated sequentially, to find $i_1$, so that $$\binom{i_1}{1} \le \text{index}_1 < \binom{i_1+1}{1}.$$

In this case, $t_1 = i_1$. When $t_2$ and $t_1$ are known, a time domain location of each transmission is known, and may be converted into a bitmap form. For example, $i_2 = 2$ may be found through calculation herein, so that $$\binom{i_2}{2} = \binom{2}{2} = 1 \le 2 < \binom{i_2+1}{2} = \binom{2+1}{2} = 3.$$

In this case, $t_2 = 2$. Further, $$\text{index}_1 = \text{index} - \binom{i_2}{2} = 2 - 1 = 1,$$

and $i_1 = 1$ may be found through calculation, so that $$\binom{i_1}{1} = \binom{1}{1} = 1 \le 1 < \binom{i_1+1}{1} = \binom{2}{1} = 2.$$

In this case, $t_1 = 1$. It may be known that two transmissions are performed in subframes whose sequence numbers are 1 and 2, respectively. A corresponding bitmap (0,1,1,0,0,0,0, 0,0,0,0,0,0,0,0,0,0,0,0,0) may be obtained, and a time domain location of the last half period is obtained based on (0,0,0,0,0,0,0,0,0,0,0,0,0,0,0,0,0,1,0,1) obtained by reversing the bitmap. This method is consistent with that in Embodiment 1. Alternatively, transmission locations $t_1' = 39 - t_1 = 38$ and $t_2' = 39 - t_2 = 37$ of the last half period may be directly obtained through calculation.

Alternatively, an index may be defined as $$\text{index} = \binom{20 - t_1}{2} + \binom{20 - t_2}{1}.$$

In this case, the receive side may calculate $20 - t_1$ and $20 - t_2$ in a similar manner by using an index value, and may further obtain $t_1$ and $t_2$.

Embodiment 6 provides a specific calculation manner. Any algorithm that can be used to calculate $t_1$ and $t_2$ from a T-RPT may be used in this embodiment. This embodiment is not intended to be limiting.

In the foregoing example, that two transmissions are performed within 20 ms is used as an example for description. When a larger quantity of transmission times need to be defined, for example, m transmissions, a T-RPT may be defined as $$\text{index} = \sum_{i=1}^{m} \binom{t_i}{i}.$$

A manner of obtaining $t_i$, $i = 1, 2, \ldots, m$ from the T-RPT is similar to the foregoing method. First, $i_m$ is found, so that $$\binom{i_m}{m} \le \text{index} < \binom{i_m+1}{m}.$$

In this case, $t_m = i_m$. Then, assuming $$\text{index}_{m-1} = \text{index} - \binom{i_m}{m},$$

$t_{m-1}$ is calculated, and so on. For Table 7 and Table 9 in Embodiment 5, assuming $m = 3$, this manner may be used for calculation. For Table 6 and Table 8, the bitmap whose first bit is deleted may alternatively be calculated in a similar manner.

Similar to Embodiment 1, when a quantity of subframes that need to be used for transmission within one period is variable, an additional field may be added to the second control information, to indicate a quantity of transmission times, such as 1, 2, or 4. When the indicated quantity of transmission times is 4, $$\text{index} = \binom{t_2}{2} + \binom{t_1}{1},$$

and there are 190 possible cases. When the indicated quantity of transmission times is 2, $$\text{index} = \binom{t_1}{1},$$

and there are 20 possible cases. When the indicated quantity of transmission times is 1, an index indicates 0 to 39, and there are 40 possible cases. The indexes correspond to Table 2, Table 3, and Table 4, respectively.

Certainly, similar to Embodiment 1, a quantity of transmission times may alternatively be directly indicated by using an index field. For example, when $0 \le \text{index} \le 189$ the indicated quantity of transmission times is 4, and $$\text{index} = \binom{t_2}{2} + \binom{t_1}{1};$$

when $190 \le \text{index} \le 209$, the indicated quantity of transmission times is 2, and $$\text{index} - 190 = \binom{t_1}{1};$$

and when 210≤index≤249, an indicated time domain location is index−210.

Optionally, for m transmissions within T ms, a T-RPT may be defined as $$\text{index} = \sum_{i=1}^{m} \binom{T-t_i}{m+1-i},$$

and a calculation manner is similar. Details are not described again.

Embodiment 7

Embodiment 7 corresponds to Embodiment 1, and provides UE and a network device that perform the data transmission method described in Embodiment 1.

The technical solution provided by Embodiment 7 of the present invention is described below with reference to FIG. 16 and FIG. 17.

Figure 16:
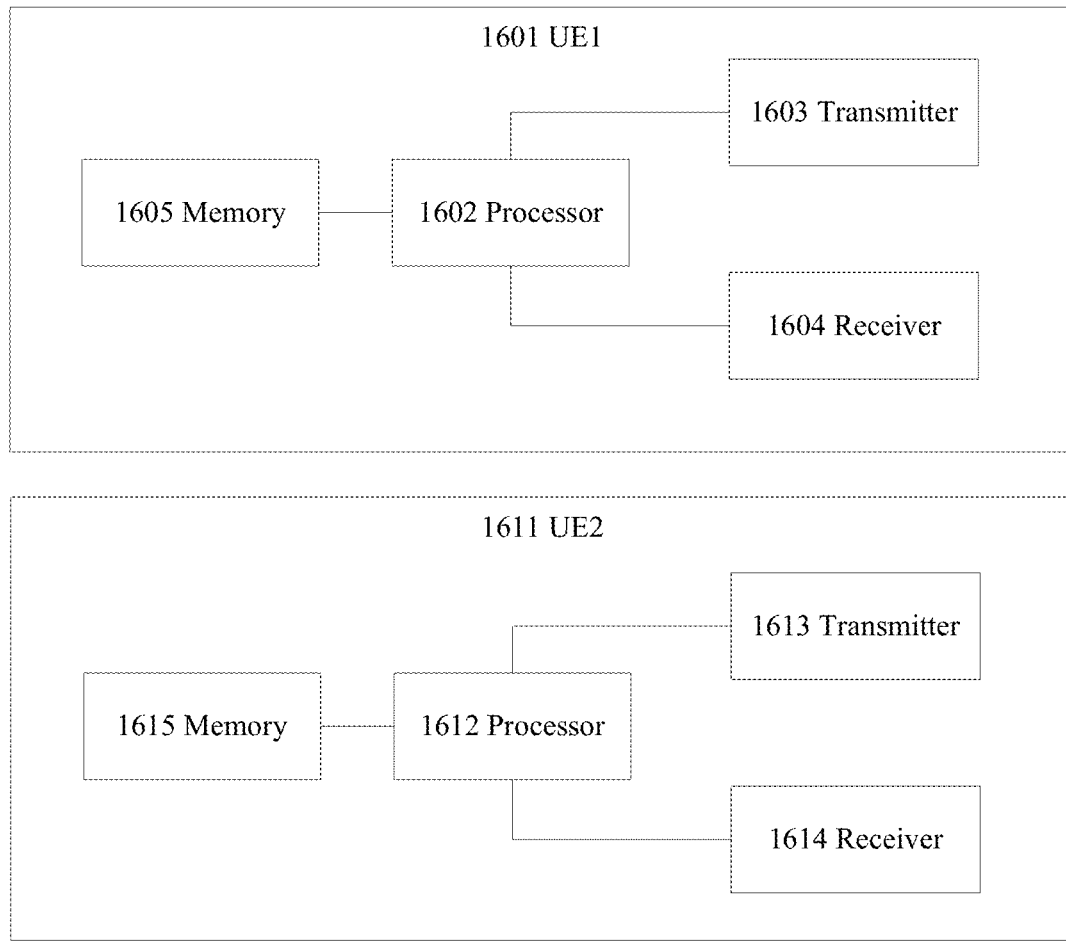
FIG. 16 is a schematic structural diagram of UE according to an embodiment of this application.

As shown in FIG. 16, UE1 1601 described in this embodiment of this application includes the following components: a processor 1602, a transmitter 1603, a receiver 1604, and a memory 1605. UE2 1611 has a same structure as the UE1, and includes the following components: a processor 1612, a transmitter 1613, a receiver 1614, and a memory 1615.

Figure 17:
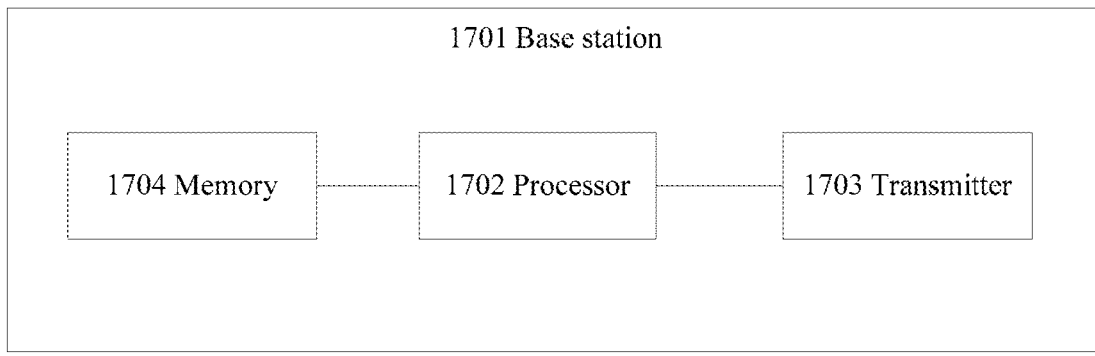
FIG. 17 is a schematic structural diagram of a base station according to an embodiment of this application.

As shown in FIG. 17, a base station 1701 described in this embodiment of this application includes a processor 1702, a transmitter 1703, and a memory 1704.

Persons skilled in the art should understand that the UE1 1601, the UE2 1611, and the base station 1701 should further include other necessary components, for example, a power unit, implementing communications function of the UE1 1601, the UE2 1611, and the base station 1701. However, the foregoing components are irrelevant to the present invention. Details are not described herein.

Embodiment 7 corresponds to Embodiment 1. Therefore, a concept of Embodiment 7 is the same as a concept of Embodiment 1, and a data transmission manner is also the same as a data transmission manner of Embodiment 1. Details about content the same as that in Embodiment 1 are not described herein again. The UE and the base station are described below with reference to FIG. 8.

Step 801: The transmitter 1703 of the base station 1701 sends first control information to the sending UE1 1601, where the first control information includes first time domain resource indication information.

In step 801, the first control information is generated by the processor 1702 of the base station 1701, and delivered to the transmitter 1703. The receiver 1604 of the UE1 1601 receives the first control information and delivers the first control information to the processor 1602. Content of a signaling channel and the first control information that are sent by using the first control information is the same as that in Embodiment 1. Similar to Embodiment 1, step 801 may be omitted.

Step 802: The processor 1602 of the sending UE1 1601 determines second time domain resource indication information. When step 801 is not performed, the memory 1605 of the UE1 1601 has preconfigured a plurality of pieces of time domain resource indication information, and the processor 1602 may autonomously select a piece of appropriate second time domain resource indication information based on a property (such as a data amount and a priority) of to-be-sent data and a wireless network channel state. When step 801 is performed, the processor 1602 of the UE1 1601 obtains the first time domain resource indication information from the first control information. In this case, the processor 1602 may directly use the first time domain resource indication information received from the base station 1701, and the second time domain resource indication information is the first time domain resource indication information. Certainly, the processor 1602 may alternatively compare the received first time domain resource indication information with the plurality of pieces of time domain resource indication information that have been preconfigured by the memory 1605, to select time domain resource indication information that is most appropriate for transmitting the to-be-sent data. In this case, the second time domain resource indication information may be different from the first time domain resource indication information.

In Embodiment 7, meanings and specific examples of the first time domain resource indication information and the second time domain resource indication information are the same as related content in Embodiment 1. Similar to Embodiment 1, a T-RPT may be an index value, a bitmap may be obtained through table lookup by using the index value, and so on. A table of a correspondence between a T-RPT and a bitmap may be prestored in the memory 1605 of the UE1, the memory 1615 of the UE2, and the memory 1704 of the base station. The processor 1602 of the UE1 may autonomously select an appropriate bitmap to send data, and the base station does not need to send the first time domain resource indication information. In a specific selection process, the processor 1602 may determine a bitmap based on an index, or may directly determine a bitmap. Both the bitmaps are equivalent. Similar to Embodiment 1, content of the table may be constant, or may be variable. For example, the base station may send signaling to the UE1 by using the transmitter 1703. After receiving the signaling, the receiver 1604 of the UE1 delivers the signaling to the processor 1602. The processor 1602 may configure, based on the signaling, the table stored in the memory 1605. In this way, a more flexible mechanism can be implemented. Similar to Embodiment 1, the bitmap may also be applicable to a relatively small time range. As shown in FIG. 11, assuming that a period is 200 ms, the bitmap is applicable to the first 40 ms. A parameter indicating which time segment the bitmap is specifically applicable to may be preconfigured in the UE, or may be configured by the base station for the UE. For example, the base station may configure the parameter for the UE1 by sending RRC layer signaling (such as a system message and RRC dedicated signaling), MAC layer signaling (a MAC CE), or physical layer signaling (such as DCI) to the UE1 by using the transmitter 1703. After receiving the foregoing signaling, the receiver 1604 of the UE1 delivers the foregoing signaling to the processor 1602; and the processor 1602 may set, based on the signaling, a time segment to which the bitmap is applicable.

Step 803: The processor 1602 of the sending UE1 1601 determines, based on the second time domain resource indication information determined in step 802, a time domain resource occupied within a double time length. A manner of determining, by the processor 1602, the time domain resource occupied within the double time length is exactly the same as that in step 803 in Embodiment 1. The processor 1602 generates second control information, where the second control information includes the second time domain resource indication information; the processor 1602 generates a data packet, where the data packet may be sent on the determined time domain resource occupied within the double time length; and the processor 1602 delivers the second control information and the data packet to the transmitter 1603, so that the transmitter 1603 sends the second control information and the data packet to the UE2 1611. In a possible implementation, the second control information generated by the processor 1602 in step 803 may be SA and may be transmitted in an SA resource pool. The SA includes the T-RPT used as the second time domain resource indication information, and the data packet generated by the processor 1602 in step 803 is data corresponding to the SA.

Step 804: The transmitter 1603 of the sending UE1 1601 sends second control information to the receiving UE2 1611, where the second control information includes the second time domain resource indication information determined in step 802.

Step 805: The receiver 1614 of the receiving UE2 1611 receives the second control information sent by the sending UE1 1601, and delivers the second control information to the processor 1612. The processor 1612 obtains the second time domain resource indication information. In an optional implementation, the second control information may be SA and transmitted to the UE2 in an SA resource pool in step 804; and the second time domain resource indication information is the T-RPT.

Step 806: The transmitter 1603 of the sending UE1 1601 sends data to the UE2 1611 on the time domain resource determined in step 803.

Step 807: The processor 1612 of the receiving UE2 1611 determines, based on the second time domain resource indication information obtained in step 805, the time domain resource occupied within the double time length, and controls the receiver 1614 to receive the data on the determined time domain resource. A manner of determining, by the processor 1612, the time domain resource occupied within the double time length is exactly the same as the manner of the UE1 in step 803. Details are not described herein again.

Similar to Embodiment 1, when a case in which a quantity of subframes that need to be used for transmission within one period is variable is considered, in a possible implementation, one table is independently defined for each quantity of transmission times, and is stored in the memory 1605 of the UE1, the memory 1615 of the UE2, and the memory 1704 of the base station. When there are a plurality of bitmaps, in step 802, when determining the time domain resource indication information, the processor 1602 not only needs to determine the T-RPT, but also needs to determine which bitmap the T-RPT is located in. In step 803, the processor 1602 determines, based on a corresponding bitmap, the time domain resource occupied within the double time length. In step 804, the second control information sent by the transmitter 1603 not only includes the T-RPT, but also includes information indicating a quantity of transmission times within the entire period, or includes information indicating which bitmap is to be used, where the indication information may be generated by the processor 1602 and delivered to the transmitter 1603. In step 805, when receiving the second control information, the receiver 1614 of the UE2 1611 not only receives the T-RPT, but also receives the information indicating the quantity of transmission times within the entire period, or receives the information indicating which bitmap is to be used; the receiver 1614 delivers the indication information to the processor 1612. In step 807, the processor 1612 may determine which table the T-RPT is to be used for, to control the receiver 1614 to receive the data on the correct time domain resource.

Similar to Embodiment 1, the foregoing plurality of tables corresponding to different quantities of transmission times may be combined into one large table, and T-RPTs are numbered in order. The quantity of transmission times may be directly obtained based on the T-RPT, and no additional indication is required.

A beneficial technical effect obtained in Embodiment 7 is the same as that in Embodiment 1. Details are not described herein again.

Similar to Embodiment 1, Embodiment 7 may also have a variant: In step 803, when determining the time domain resource occupied within the double time length, the processor 1602 of the sending UE1 1601 reuses the resource indication information two times. In other words, an occupation status of a time domain resource of the last half period is obtained through reproduction or panning from an occupation status within the first half period. Correspondingly, in step 807, the processor 1612 of the receiving UE2 1611 determines, according to a same rule, the time domain resource occupied within the double time length.

Embodiment 8

Embodiment 8 corresponds to Embodiment 2, and provides UE and a network device that perform the data transmission method described in Embodiment 2.

The technical solution in Embodiment 8 of the present invention is described below with reference to FIG. 16 and FIG. 17.

Embodiment 8 corresponds to Embodiment 2. Therefore, a concept of Embodiment 8 is the same as a concept of Embodiment 2, and a data transmission manner is also the same as a data transmission manner of Embodiment 2. Details about content the same as that in Embodiment 2 are not described herein again.

In Embodiment 8, improvements are made on step 803 and step 807 in Embodiment 1 and Embodiment 7, and are applicable to a scenario in which a period is relatively long.

As shown in FIG. 12, in step 803, the processor 1602 of the sending UE1 1601 first determines, in a manner in Embodiment 7, a time domain resource occupied within a double time length, repeats the foregoing process within a remaining time length, and determines a time domain resource occupied within a subsequent double time length, until the period ends.

In step 807, after obtaining the second time domain resource indication information, the processor 1612 of the receiving UE2 1611 determines a time domain resource occupation manner by using a method the same as a method used in step 803.

For a non-integral multiple scenario, similar to Embodiment 2, truncation may be performed at the end of the period. Details are not described herein again.

Similar to Embodiment 2, a variant of Embodiment 8 is: The time domain resource indication information is not applied to the entire period, but applied to only some time domain resources within the entire period. A specific time length to which the time domain resource is applied may be sent by the base station 1701 to the UE1 1601 by using the transmitter 1703 and by using a system message or a dedicated message, or a corresponding time length may be selected by the processor 1602 of the sending UE1 1601 based on a priority, a message type, and the like of the sending UE1 1601. The transmitter 1603 may send the time length to the UE2 1611 by using the second control information (SA data). The case is described below.

In a second scenario in Embodiment 8, step 803, step 804, step 805, and step 807 in Embodiment 7 are improved, and remaining steps are the same as those in Embodiment 7. The following describes only steps that are improved in the second scenario of Embodiment 8 in comparison with Embodiment 7.

As shown in FIG. 13, in step 803, the processor 1602 of the sending UE1 1601 selects an applicable time length based on a priority, a message type, and the like of the sending UE1 1601. In an example in FIG. 13, the processor 1602 selects time domain resource indication information that is applied to a time length 80 ms. The processor 1602 determines, in the foregoing manner, a time domain resource occupied within the time length 80 ms. The processor 1602 generates the second control information. The second control information includes the second time domain resource indication information determined by the processor 1602 in step 802 and the applicable time length, namely, 80 ms, determined by the processor 1602 in step 803. The second control information may be SA information or SA data, and the applicable time length is sent to the UE2 1611 by using the SA information or the SA data.

In step 804, the processor 1602 delivers the second control information to the transmitter 1603, and the transmitter sends the second control information to the receiving UE2 1611. The second control information further includes the applicable time length.

In step 805, the receiver 1614 of the UE2 1611 receives the second control information, and delivers the second control information to the processor 1612, and the processor 1612 obtains the second time domain resource indication information and the applicable time length from the second control information.

In step 807, after obtaining the second time domain resource indication information, the processor 1612 of the receiving UE2 1611 determines, with reference to the applicable time length, a time domain resource occupation manner by using a method the same as a method used by the processor 1602 of the UE1 1601 in step 803. For a non-integral multiple scenario, truncation may be performed at the end of the period. Details are not described herein.

A beneficial technical effect obtained in Embodiment 8 is the same as that in Embodiment 2. Details are not described herein again.

Embodiment 9

Embodiment 9 corresponds to Embodiment 3, and provides UE and a network device that perform the data transmission method described in Embodiment 3.

The technical solution in Embodiment 9 of the present invention is described below with reference to FIG. 16 and FIG. 17.

Embodiment 9 corresponds to Embodiment 3. Therefore, a concept of Embodiment 9 is the same as a concept of Embodiment 3, and a data transmission manner is also the same as a data transmission manner of Embodiment 3. Details about content the same as that in Embodiment 3 are not described herein again.

In Embodiment 9, improvements are made on step 803, step 804, and step 805 in Embodiment 7 and Embodiment 8, and are applicable to a scenario in which a period is variable.

In step 803, the processor 1602 of the sending UE1 1601 determines a period length. When the processor 1602 generates the second control information, the second control information not only includes the second time domain resource indication information, but also includes the period length.

In step 804, the processor 1602 delivers the second control information to the transmitter 1603, and the transmitter sends the second control information to the receiving UE2 1611. The second control information further includes the period length. The second control information may be SA information or SA data, and the period length is sent to the UE2 by using the SA information or the SA data.

In step 805, the receiver 1614 of the UE2 1611 receives the second control information, and delivers the second control information to the processor 1612, and the processor 1612 obtains the second time domain resource indication information and the period length from the second control information. The processor 1612 sets the obtained period length as a period length of current transmission.

A beneficial technical effect obtained in Embodiment 9 is the same as that in Embodiment 3. Details are not described herein again.

Embodiment 10

Embodiment 10 corresponds to Embodiment 4, and provides UE and a network device that perform the data transmission method described in Embodiment 4.

The technical solution in Embodiment 10 of the present invention is described below with reference to FIG. 16 and FIG. 17.

Embodiment 10 corresponds to Embodiment 4. Therefore, a concept of Embodiment 10 is the same as a concept of Embodiment 4, and a data transmission manner is also the same as a data transmission manner of Embodiment 4. Details about content the same as that in Embodiment 4 are not described herein again.

In Embodiment 10, improvements are made on steps 803, 804, 805, and 806 in Embodiments 6 to 8: A bitmap may be applicable to a different time length.

As shown in FIG. 14, in step 803 in Embodiment 10, the processor 1602 of the sending UE1 1601 first determines a time length to which a bitmap is applicable. The processor 1602 learns that the bitmap is (1,1,0,0,0,0,0,0,0,0,0,0,0,0,0,0,0,0,0,0), and the bitmap is not applicable to 20 ms. Instead, the bitmap, for example, may be applicable to 10 ms. In this case, the processor 1602 may truncate the bitmap to (1,1,0,0,0,0,0,0,0,0) for use, and the processor 1602 generates a target time length. The target time length is a length, namely, 10 ms, after the bitmap is truncated. When the processor 1602 generates the second control information, the second control information not only includes the second time domain resource indication information, but also includes the target time length. The processor 1602 determines a time domain resource occupied within a double time length, namely, applies the truncated bitmap (1,1,0,0,0,0,0,0,0,0) within the double time length 20 ms.

In step 804, the processor 1602 delivers the second control information to the transmitter 1603, and the transmitter 1603 sends the second control information to the receiving UE2 1611. The second control information includes the second time domain resource indication information and the target time length, namely, 10 ms in an example in FIG. 14. In this case, the target time length means a time length obtained after the bitmap is truncated. The second control information may be SA information or SA data, and the target time length is sent to the UE2 by using the SA information or the SA data.

In step 805, the receiver 1614 of the receiving UE2 1611 receives the second control information, and delivers the second control information to the processor 1612, and the processor 1612 obtains the second time domain resource indication information and the target time length from the second control information.

In step 807, after obtaining the second time domain resource indication information, the processor 1612 of the receiving UE2 1611 sets the obtained target time length as a time length to which the bitmap is applied, and determines a time domain resource occupation manner by using a method that is the same as that used by the processor 1602 in step 803 and that is shown in FIG. 14.

Optionally, as shown in FIG. 14, a meaning of the target time length may be further set as: a time length obtained after the bitmap is truncated and is extended once. In this case, the target time length is 20 ms. The processor 1602 of the UE1 learns that a bitmap with a length of 10 ms is required. However, the bitmap (1,1,0,0,0,0,0,0,0,0,0,0,0,0, 0,0,0,0,0,0) is 20 ms. Therefore, the processor 1602 truncates the bitmap to (1,1,0,0,0,0,0,0,0,0) for use. Similarly, after the UE2 receives the target time length 20 ms, the processor 1612 also performs same determining and a same operation.

A beneficial technical effect obtained in Embodiment 10 is the same as that in Embodiment 4. Details are not described herein again.

Embodiment 11

Embodiment 11 corresponds to Embodiment 5, and provides UE and a network device that perform the data transmission method described in Embodiment 5.

The technical solution in Embodiment 11 of the present invention is described below with reference to FIG. 16.

Embodiment 11 corresponds to Embodiment 5. Therefore, a concept of Embodiment 11 is the same as a concept of Embodiment 5, and a data transmission manner is also the same as a data transmission manner of Embodiment 5. Details about content the same as that in Embodiment 5 are not described herein again.

In Embodiment 11, step 803 and step 807 in Embodiments 7 to 10 are improved, to obtain new step 803a and step 807a.

In step 803a, the processor 1602 of the sending UE1 1601 determines K time domain resources of M time domain resources based on the second time domain resource indication information determined in step 802. The first of the K time domain resources is the first of the K time domain resources, remaining K−1 of the K time domain resources are a subset of remaining M−1 of the M time domain resources, M is a positive integer, K is a positive integer, K is less than or equal to M, and K is a quantity of transmission times of one piece of data.

In step 807a, the processor 1611 of the receiving UE2 1612 determines a time domain resource occupation manner based on the second time domain resource indication information by using a method the same as a method used in step 803a. Details are not described herein again.

Optionally, that K is a positive integer further includes: the sending user equipment receives K from the base station; or the sending user equipment autonomously selects K; or K is preconfigured on the sending user equipment.

Optionally, that M is a positive integer further includes: the sending user equipment receives M from the base station; or the sending user equipment autonomously selects M; or M is preconfigured on the sending user equipment.

Optionally, the M time domain resources further include: the M time domain resources may be continuous or discontinuous in time domain.

A beneficial technical effect obtained in Embodiment 11 is the same as that in Embodiment 5. Details are not described herein again.

Embodiment 12

Embodiment 12 corresponds to Embodiment 6, and provides UE and a network device that perform the data transmission method described in Embodiment 6.

The technical solution in Embodiment 12 of the present invention is described below with reference to FIG. 16 and FIG. 17.

Embodiment 12 corresponds to Embodiment 6. Therefore, a concept of Embodiment 12 is the same as a concept of Embodiment 6, and a data transmission manner is also the same as a data transmission manner of Embodiment 6. Details about content the same as that in Embodiment 6 are not described herein again.

In Embodiment 12, step 803 and step 807 in Embodiments 7 to 11 are improved. The processor 1702 of the base station 1701, the processor 1602 of the UE1 1601, and the processor 1612 of the UE2 1611 obtain a relationship between a T-RPT and a bitmap through calculation, and do not need to store a table, thereby saving storage space.

In Embodiment 12, a T-RPT is defined and calculated, and one additional field is added to the second control information, to indicate a quantity of transmission times, which are all the same as those in Embodiment 6, and an execution body is the processor 1702, the processor 1602, or the processor 1612. Details are not described herein again.

A beneficial technical effect obtained in Embodiment 12 is the same as that in Embodiment 6. Details are not described herein again.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces, indirect couplings or communication connections between the apparatuses or units, electrical connections, mechanical connections, or connections in other forms.

Although some preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A data transmission method, comprising:
   determining, by user equipment, a time domain resource within a T2 time length based on second time domain resource indication information, wherein the second time domain resource indication information indicates a time domain resource occupied for data transmission within a T1 time length, wherein T2 is twice of T1;
   sending, by the user equipment, second control information, wherein the second control information comprises the second time domain resource indication information; and
   sending, by the user equipment, data using the time domain resource that is determined within the T2 time length.

2. The method according to claim 1, wherein the method further comprises:
   receiving, by the user equipment, first control information from a base station, wherein the first control information comprises first time domain resource indication information configured by the base station for the user equipment.

3. The method according to claim 2, further comprising:
   determining, by the user equipment, the second time domain resource indication information based on the first control information received from the base station; or
   autonomously selecting, by the user equipment, the second time domain resource indication information.

4. The method according to claim 1, wherein determining, by user equipment, the time domain resource within the T2 time length based on the second time domain resource indication information comprises at least one of the following:
   equally dividing the T2 time length into two T1 time lengths; and at least one of the following:
   using, by the user equipment, the second time domain resource indication information within one T1 time length, and using a reversed second time domain resource indication information within the other T1 time length; or
   using, by the user equipment, the second time domain resource indication information within one T1 time length, and reversing a time domain resource within the T1 time length, to obtain a time domain resource within the other T1 time length.

5. The method according to claim 1, wherein the method further comprises:
   sending, by the user equipment, data using a time domain resource within a T3 time length; and, wherein
   if T3 is greater than T2, applying, to the T3 time length, a time domain resource occupation manner determined within the T2 time length; and
   if T3 is less than T2, truncating a time domain resource occupation manner determined within the T2 time length, and then applying the manner to the T3 time length.

6. The method according to claim 5, wherein the second control information further comprises:
   an applicable time length, wherein the applicable time length is T3.

7. User equipment, comprising a processor and a transmitter, wherein
   the processor is configured to: determine a time domain resource within a T2 time length based on second time domain resource indication information, wherein the second time domain resource indication information indicates a time domain resource occupied for data transmission within a T1 time length, wherein T2 is twice of T1;
   the processor is further configured to generate second control information, wherein the second control information comprises the second time domain resource indication information;
   the transmitter is configured to send the second control information; and
   the transmitter is further configured to send data on the time domain resource that is determined within the T2 time length.

8. The user equipment according to claim 7, wherein the user equipment further comprises:
   a receiver, configured to receive first control information from a base station, wherein the first control information comprises first time domain resource indication information configured by the base station for the user equipment.

9. The user equipment according to claim 8, wherein
   the processor is further configured to determine the second time domain resource indication information based on the first control information received from the base station; or
   the processor is further configured to autonomously select the second time domain resource indication information.

10. The user equipment according to claim 7, wherein determining the time domain resource within the T2 time length based on the second time domain resource indication information comprises:
    equally dividing the T2 time length into two T1 time lengths; and at least one of the following:
    using, by the processor, the second time domain resource indication information within one T1 time length, and using a reversed second time domain resource indication information within the other T1 time length; or
    using, by the processor, the second time domain resource indication information within one T1 time length, and reversing a time domain resource within the T1 time length, to obtain a time domain resource within the other T1 time length.

11. The user equipment according to any one of claim 7, wherein
    the processor is configured to: determine a time domain resource within a T3 time length; and, wherein if T3 is greater than T2, the processor is further configured to apply, within the T3 time length, a time domain resource occupation manner determined within the T2 time length; and if T3 is less than T2, the processor is further configured to truncate a time domain resource occupation manner determined within the T2 time length, and then apply the manner to the T3 time length; and the transmitter is configured to send data on the time domain resource within the T3 time length.

12. The user equipment according to claim 11, wherein the second control information generated by the processor further comprises an applicable time length, and the applicable time length is T3.

13. The user equipment according to claim 7, wherein the second control information generated by the processor further comprises a period length, and the period length defines a period length value of current data transmission.

14. User equipment, comprising a receiver and a processor, wherein the receiver is configured to receive control information sent by another user equipment;

the processor is configured to obtain time domain resource indication information from the control information, wherein the time domain resource indication information indicates a time domain resource occupied for data transmission within a T1 time length;

the processor is further configured to determine a time domain resource within a T2 time length based on the time domain resource indication information, wherein T2 is twice of T1; and the receiver is further configured to receive data on the time domain resource that is determined within the T2 time length.

15. The user equipment according to claim 14, wherein determining the time domain resource within the T2 time length based on the time domain resource indication information comprises at least one of the following:

equally dividing the T2 time length into two T1 time lengths; and at least one of the following:

using, by the processor, the time domain resource indication information within one T1 time length, and using a reversed time domain resource indication information within the other T1 time length; or using, by the processor, the time domain resource indication information within one T1 time length, and reversing a time domain resource within the T1 time length, to obtain a time domain resource within the other T1 time length.

16. The user equipment according to claim 14, wherein the processor is configured to:

determine a time domain resource within a T3 time length; and, wherein if T3 is greater than T2, the processor is further configured to apply, within the T3 time length, a time domain resource occupation manner determined within the T2 time length; and if T3 is less than T2, truncate a time domain resource occupation manner determined within the T2 time length, the processor is further configured to apply the manner to the T3 time length; and the receiver is configured to receive data on the time domain resource within the T3 time length.

17. The user equipment according to claim 16, wherein the control information received by the receiver further comprises an applicable time length, and the applicable time length is T3.

18. The user equipment according to claim 14, wherein the control information received by the receiver further comprises a period length, and the processor sets a period length value of current data transmission as the period length in the control information.

19. The user equipment according to claim 14, wherein the control information is SA sent on an SA resource; and the time domain resource indication information is a T-RPT.

20. The user equipment according to claim 19, wherein the control information received by the receiver further comprises a target time length, wherein the target time length satisfies at least one of the following:

the target time length is a time length obtained after a bitmap corresponding to the T-RPT is truncated, or the target time length is a time length obtained after a bitmap corresponding to the T-RPT is truncated and is extended once; and, wherein T1 is equal to the time length obtained after the bitmap is truncated.

* * * * *